US008463551B2

(12) United States Patent
Aarre

(10) Patent No.: US 8,463,551 B2
(45) Date of Patent: Jun. 11, 2013

(54) CONSISTENT DIP ESTIMATION FOR SEISMIC IMAGING

(75) Inventor: Victor Aarre, Stavanger (NO)

(73) Assignee: Schlumberger Technology Corporation, Sugar Land, TX (US)

(*) Notice: Subject to any disclaimer, the term of this patent is extended or adjusted under 35 U.S.C. 154(b) by 266 days.

(21) Appl. No.: 12/891,859

(22) Filed: Sep. 28, 2010

(65) Prior Publication Data

US 2011/0118985 A1    May 19, 2011

Related U.S. Application Data

(60) Provisional application No. 61/261,828, filed on Nov. 17, 2009.

(51) Int. Cl.
*G01V 1/28* (2006.01)
(52) U.S. Cl.
USPC ............................................. 702/16
(58) Field of Classification Search
USPC ................... 702/16, 17; 367/38, 53
See application file for complete search history.

(56) References Cited

U.S. PATENT DOCUMENTS

| 4,293,933 | A | 10/1981 | Park et al. |
| 4,302,723 | A | 11/1981 | Moran |
| 4,316,250 | A | 2/1982 | Vincent |
| 5,299,128 | A | 3/1994 | Antoine et al. |
| 5,892,732 | A * | 4/1999 | Gersztenkorn ................. 367/72 |
| 6,226,595 | B1 | 5/2001 | Rossi et al. |
| 6,856,910 | B2 | 2/2005 | Goswami et al. |
| 7,373,252 | B2 * | 5/2008 | Sherrill et al. ................. 702/17 |
| 2005/0083063 | A1 | 4/2005 | Omeragic et al. |

FOREIGN PATENT DOCUMENTS

| WO | 2005/017564 A1 | 2/2005 |
| WO | 2006/055137 A2 | 5/2006 |

* cited by examiner

*Primary Examiner* — Bryan Bui

(57) ABSTRACT

Systems and methods perform consistent dip estimation for seismic imaging. An example system applies global consistency constraints during iterative volume dip estimation of a seismic volume to improve upon conventional dip estimation methods. With each iteration, the system applies single and joint dip constraints, checking local dip estimates for reciprocity, causality, consistency, and vertical and lateral continuity. At discontinuities in the seismic volume, local divergences are marked with a quality attribute. Upon convergence of the volume dip estimation, the volume may be rendered in 3D, including the discontinuities. In performing volume dip estimation, the system can also provide automatic horizon interpretation and automatic fault detection.

20 Claims, 21 Drawing Sheets

TAYLOR EXPANSION  1400

$T_i(z) = T_{i-1}(z+\Delta z(z))$    // PROBLEM STATEMENT $T_i(z) = T_{i-1}(z) + \Delta z(z) * T^1_{i-1}(z)$    // TAYLOR 1- TERM EXPANSION $\Delta z(z) = [\, T_i(z) - T_{i-1}(z) \,] / T_{i-1}(z)$ $\Delta z(z) = T^1_{i-1}(z) * [\, T_i(z) - T_{i-1}(z) \,] / [\, T_{i-1}(z) * T^1_{i-1}(z) + \varepsilon \,]$

FIG. 14

CONSISTENT DIP ESTIMATION FOR SEISMIC IMAGING

RELATED APPLICATIONS

This patent application claims the benefit of priority to U.S. Provisional Patent Application No. 61/261,828 to Victor Aarre, filed Nov. 17, 2009, and incorporated herein by reference in its entirety.

BACKGROUND

A conventional geologic model, as used in the oil and gas industry, or for subsurface imaging in general, is a computer-based representation of a subsurface earth volume, such as a petroleum reservoir or a depositional basin. Technology for three-dimensional (3D) geological modeling or static reservoir modeling continues to advance.

Seismic-to-simulation using seismic data ("seismic") is the process of generating three-dimensional models of a subsurface earth volume. Such models are used for imaging reservoirs for predicting storage, or for hydrocarbon production, selecting well placement, and optimizing reservoir management in general. A resulting three-dimensional model should faithfully represent original well logs, seismic data, and production history.

A "dip" as used in the seismic modeling arts, may be defined as an attribute that computes, for each seismic trace, the best fit plane (3D), or line (2D), between its immediate neighbor traces on a horizon, and outputs the magnitude of dip (gradient) of the plane or line, in degrees or other measure. The dip attributes can be used to create a pseudo-paleogeologic map on a horizon slice or other seismic map or image. A horizon is a subsurface interface, layer, or layer boundary, between two substances, e.g., between two layers of rock. Thus, a horizon is a 3D surface in the actual earth volume, but may be represented in 3D or in 2D, when imaged.

A fundamental problem with conventional dip estimation methods is their reliance on calculating only local estimates of dip, without taking into account global consistency constraints. The local dip estimations can be calculated through cross-correlation, or gradient-based methods. In order to make these local estimates look consistent and spatially continuous, conventional methods usually apply a mean filter to the local estimates for smoothing. But these conventional dip estimating techniques can be improved.

SUMMARY

Systems and methods perform consistent dip estimation for seismic imaging. An example system applies global consistency constraints during iterative volume dip estimation of a seismic volume to improve upon conventional dip estimation methods. With each iteration, the system applies single and joint dip constraints, checking local dip estimates for reciprocity, causality, consistency, and vertical and lateral continuity. At discontinuities in the seismic volume, local divergences are marked with a quality attribute. Upon convergence of the volume dip estimation, the volume may be rendered in 3D, including the discontinuities. In performing volume dip estimation, the system can also provide automatic horizon interpretation and automatic fault detection.

This summary section is not intended to give a full description of consistent dip estimation for seismic imaging, or to provide a comprehensive list of features and elements. A detailed description with example implementations follows.

BRIEF DESCRIPTION OF THE DRAWINGS

FIG. 14 is a diagram showing notation of an example Taylor Series expansion, for estimating dip.

DETAILED DESCRIPTION

Overview

This disclosure describes systems and methods for consistent dip estimation in seismic imaging. An example system performs iterative dip estimation for an earth volume based on seismic data, applying single (or singular) dip constraints and joint dip constraints during iteration. The example systems and methods present a beneficially counter-intuitive and useful process of seismic volume dip estimation, which includes features not currently addressed in conventional dip estimation techniques. By extension, the example system is also useful for automatic horizon interpretation and automatic fault detection. Implementations of the system can improve upon existing dip estimation methods.

A fundamental problem with conventional estimation methods is that they calculate only local estimates of dip, without taking into account global consistency constraints. The local dip estimations can be calculated, for example, through cross-correlation or through a gradient-based method. In order to make these local estimates look consistent and spatially continuous, the local estimates are sometimes smoothed using, for example, a mean filter.

An example system described herein, in contrast, performs an iterative global optimization method, deriving a dip model which satisfies the following constraints as closely as reasonably possible:

Reciprocity
Causality
Consistency
Vertical & Lateral Continuity

These constraints assume that the estimated dip fields are continuous functions (i.e., that the dip fields have well-defined partial derivatives everywhere). This is not always the case in nature (say, in the presence of a geologic fault), so example methods may not converge to a stable solution everywhere within a volume.

An example system described herein allows the iterative process to perform dip estimation, and to terminate without arriving at a stable solution at some locations. In one implementation, at each location, the system outputs a quality attribute (which can also be considered a "quality control attribute" or a "convergence attribute") indicating where the process converges to a stable solution, and where it diverges, recognizing that this convergence attribute (hereinafter "quality attribute") can convey important information about the seismic volume, and hence about the layering in the ground. For example, the quality attribute can indicate a geologic fault or other discontinuity.

Example Seismic Imaging Environment

Figure 1:
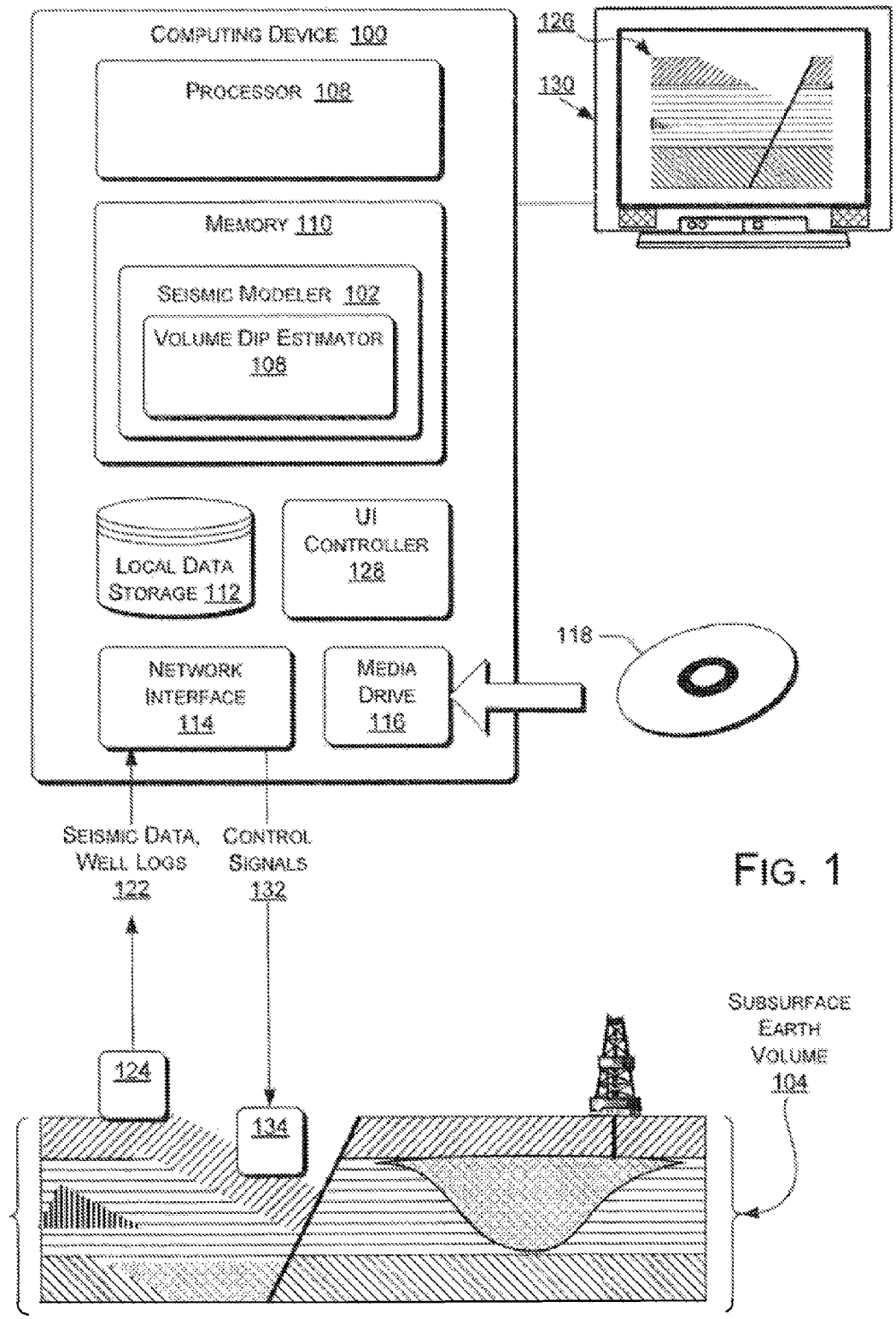
FIG. 1 is a diagram of an example seismic imaging environment in which consistent volume dip estimation is utilized.

FIG. 1 shows an example system that utilizes consistent volume dip estimation. A computing device 100 implements a component, such as a geologic modeler 102 that models or otherwise analogizes a subsurface earth volume, such as a depositional basin or petroleum reservoir. The geologic modeler 102 is illustrated as software, but can be implemented as hardware or as a combination of hardware and software instructions.

In the illustrated example, the computing device 100 is communicatively coupled via sensory and control devices with a real-world "subsurface earth volume" 104, i.e., an actual earth volume, petroleum reservoir, depositional basin, oilfield, wells, surface control network, etc. Although the computing device 100 is shown specifically in communication with a petroleum resource, the computing device 100 may be in communication with any subsurface earth volume, since the subsurface volume being modeled may only be a candidate for petroleum production, water resource management, carbon services, or other use.

The computing device 100 may be a computer, computer network, or other device that has a processor 108, memory 110, data storage 112, and other associated hardware such as a network interface 114 and a media drive 116 for reading and writing a removable storage medium 118. The removable storage medium 118 can be, for example, a compact disk (CD); digital versatile disk/digital video disk (DVD); flash drive, etc., The geologic modeler 102 includes a volume dip estimation engine 120, either integrated as part of the fabric of the geologic modeler 102; as a separate module in communication with the geologic modeler 102; or as a retrofit module added on, for example, to an updated version of the geologic modeler 102.

The removable storage medium 118 may include instructions for implementing and executing the volume dip estimation engine 120. At least some parts of the volume dip estimation engine 120 can be stored as instructions on a given instance of the removable storage medium 118, removable device, or in local data storage 112, to be loaded into memory 110 for execution by the processor 108.

Although the illustrated geologic modeler 102 is depicted as a program residing in memory 110, a geologic modeler 102 may be implemented as hardware, such as an application specific integrated circuit (ASIC) or as a combination of hardware and software.

In this example system, the computing device 100 receives field data, such as seismic data and well logs 122 from a connected device 124 in communication with, and collecting data from, geophones or other sensors for a potential petroleum field or other subsurface earth volume 104 via the network interface 114.

A display controller 128 may output geologic model images 126, such as a 2D or 3D visual representation of layers in a subsurface earth volume, on a display 130. The displayed geologic model images 126 are based on the output of the volume dip estimation engine 120. The volume dip estimation engine 120 may perform other modeling operations and generate useful user interfaces via the display controller 128, including novel interactive graphics, for user control of volume dip estimation.

In one implementation, based on action of the volume dip estimation engine 120, the geologic modeler 102 can also generate control signals 132 to be used via control devices 134 in real world prospecting, modeling, exploration, prediction, and/or control of resources, such as petroleum production, water resource management, carbon services, etc., including direct control via hardware control devices 134 of such resources as injection and production wells, reservoirs, fields, transport and delivery systems, and so forth.

Example Engine

Figure 2:
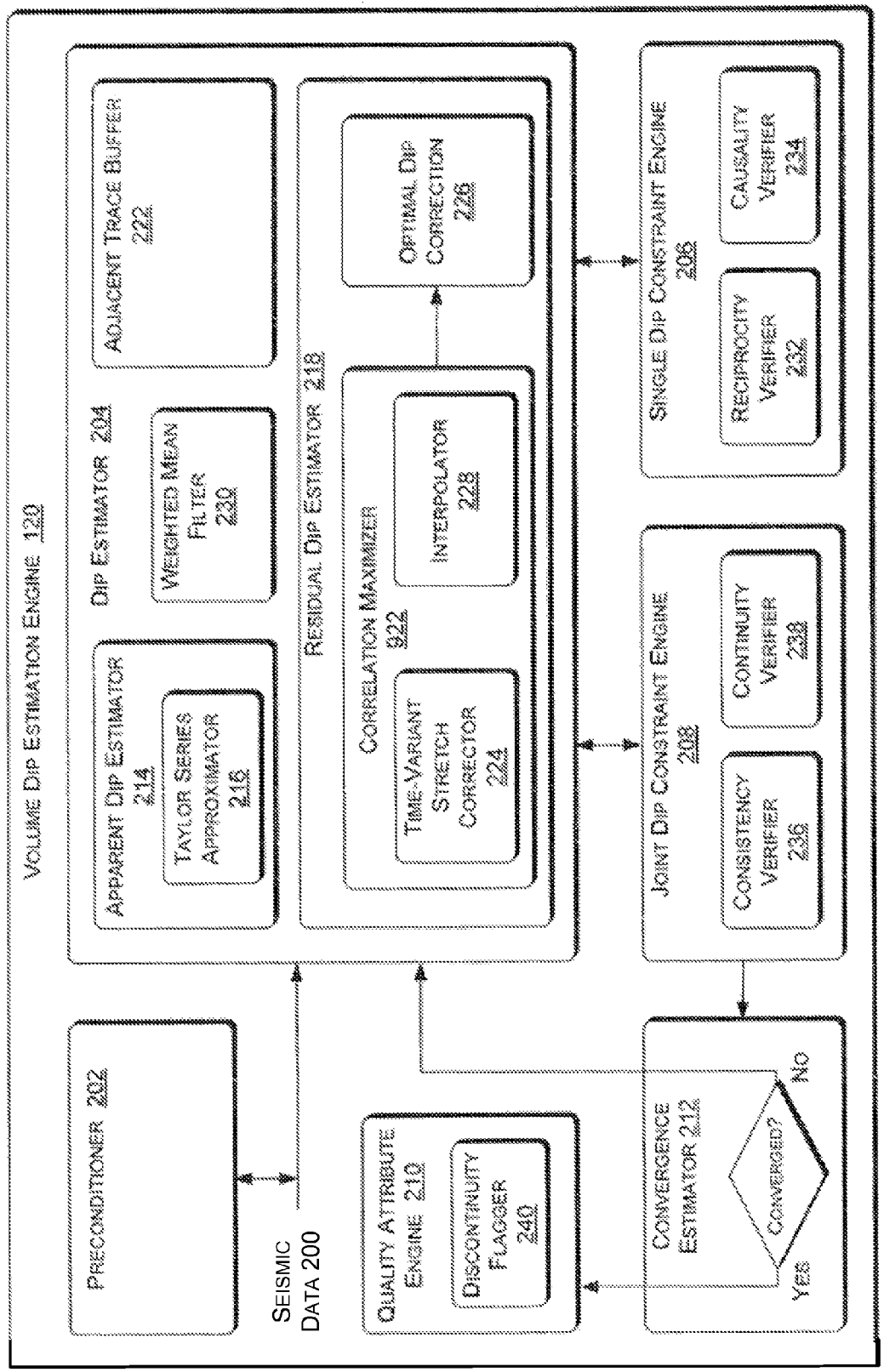
FIG. 2 is a block diagram of an example volume dip estimation engine.

FIG. 2 shows an example volume dip estimation engine 120 in greater detail than in FIG. 1. The illustrated implementation is only one example configuration, to introduce features and components of an engine that performs innovative volume dip estimation. The components may bear different names for different configurations of components to perform the functions, and different or additional components may also be used. Many other arrangements of the components and/or functions of a volume dip estimation engine 120 are possible within the scope of the subject matter. As introduced above, the volume dip estimation engine 120 can be implemented in hardware, or in combinations of hardware and software. Illustrated components are communicatively coupled with each other for communication as needed.

A list of example components for the illustrated implementation of the volume dip estimation engine 120 includes a preconditioner 202, a dip estimator 204, a single dip constraint engine 206, a joint dip constraint engine 208, a quality attribute engine 210, and a convergence estimator 212. The illustrated arrows represent general operational flow.

The dip estimator 204 may include an apparent dip estimator 214 that uses, for example, a Taylor Series approximator 216. A residual dip estimator 218 may include a correlation maximizer 220 to optimize a best fit between neighboring seismic traces, stored in an adjacent trace buffer 222. The correlation maximizer 220 may include a time-variant stretch corrector 224 and an interpolator to determine an optimal dip correction 226. The dip estimator 204 may also include an optional weighted mean filter 230. In one implementation, the weighted mean filter 230 does not have to be "weighted," and can be applied at any, or at several points in the iterative dip estimation process. The filter 230 will be described more fully below.

The single dip constraint engine 206 includes a reciprocity verifier 232 and a causality verifier, while the joint dip constraint engine 208 includes a consistency verifier 236 and a continuity verifier 238.

The quality attribute engine 210 may include a discontinuity flagger 240, to indicate locations in a volume where the iterative dip estimation process does not converge, or diverges, typically representing a physical discontinuity in the earth volume being imaged.

Dip Estimation

A primary objective of "surface seismic" is to provide an image/model of the layers of the interior of the earth. Seismic data can highlight the position of an interface between layers of different rock within the earth. In order to map particular interfaces laterally, a modeling process must be able to track the change in vertical position of the interfaces. The change in vertical position, from one spatial location to a neighboring location, is referred to as the dip of the layer in the direction towards that neighbor.

Estimating accurate seismic dips is surprisingly difficult, for many reasons: correlated noise (e.g., multiples) uncorrelated noise (e.g., random noise), limited temporal and lateral resolution restricting and blurring the imaging of thin (laterally and/or vertically) layers, e.g., through tuning and aliasing, shadow zones that yield poor imaging, complex faulting leading to ambiguous dip models, partial erosion of the layers of rock with subsequent deposition of new layers on top, and so forth.

Due to the ambiguous nature of the seismic images, multiple realizations of the horizons within a volume are possible, and hence determining the vertical position of individual interfaces is often referred to as horizon interpretation. Horizon interpretation can either be done manually, when a person uses a software tool to specify the vertical position for the horizon at each lateral location, or horizon interpretation can be performed semi-automatically, when the user specifies a set of seed-points, and a computer program then propagates the interpretation away from the seed-points based on trace-to-trace similarity criteria.

There are also computer processes which attempt to determine the location of all underground interfaces simultaneously. Such a process is often referred to as automatic 3D (volume) dip estimation, as the output of the process is usually estimated formation dip in the x and y directions, for every sample in the volume. This formation dip is often specified as angular measurements (either in radians/degrees or depth change per trace, with the units being meters or milliseconds, depending on the input measurement).

It is common terminology to refer to seismic dip mathematically as the first derivative of the depth of a surface, in either the x or the y direction, as dip is simply the change in depth per unit distance. Alternatively dip can be derived by taking the derivative of the vertical position in the inline (sail) and crossline directions. It can be argued that curvature (which is essentially the change in dip) should be the spatial derivative of the seismic dip, i.e., that curvature is the second derivative of vertical position of a horizon.

Figure 3:
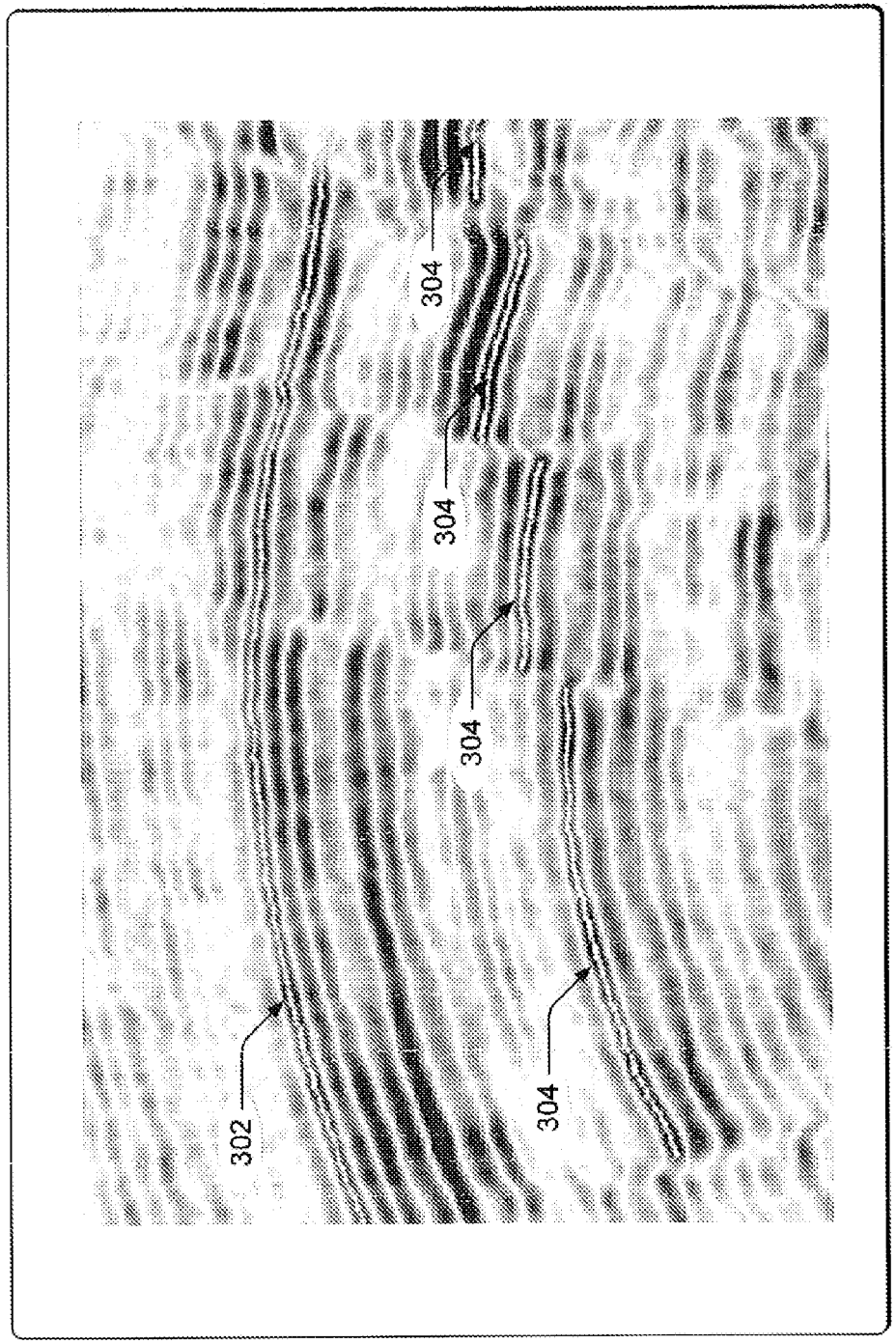
FIG. 3 is a diagram of correctly and incorrectly interpreted horizons.

Estimating reliable volume dip (and by association, automatic horizon interpretation) can be ambiguous due to the presence of geologic faults, as the tracking of a horizon across the fault is challenging due to spatial aliasing. This is illustrated in FIG. 3. The upper horizon 302 is incorrectly interpreted, due to aliasing. The lower horizon 304 (broken lines), however, is correctly interpreted, respecting the fault throw, and ignoring the apparent, but incorrect, match across the fault plane.

Figure 4:
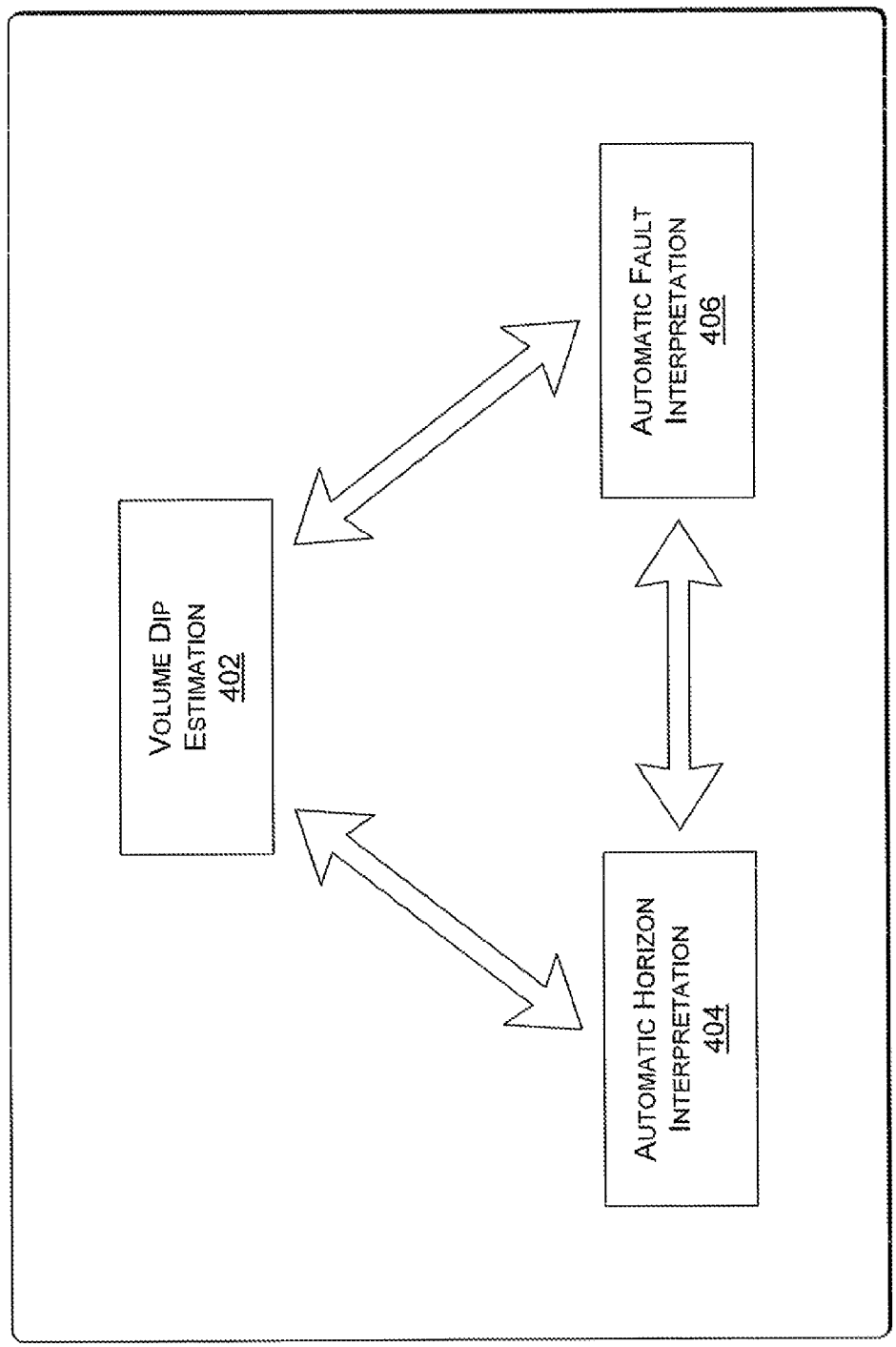
FIG. 4 is a diagram showing relation of volume dip estimation to automatic horizon interpretation and automatic fault interpretation.

As shown in FIG. 4, volume dip estimation 402, automatic horizon interpretation 404, and automatic fault detection 406 are simply three "views" of the same fundamental problem: i.e., the automatic construction of consistent volume models of the layers in the underground. Consequently, when one of these problems is solved, the other two problems are also solvable.

As mentioned, horizon interpretation is usually ambiguous, and so it is nontrivial (and sometimes impossible) to automatically determine correct volume dips, and subsequently the correct location of every single interface, in a given seismic volume. Many alternative processes have been proposed to solve this problem, but these have proven deficient, as they ignore some basic physical facts about layering in the underground.

Global Optimization Constraints

An example iterative global optimization method derives a dip model which, as closely as possible, satisfies the constraints for reciprocity, causality, consistency, and vertical & lateral continuity.

Figure 5:
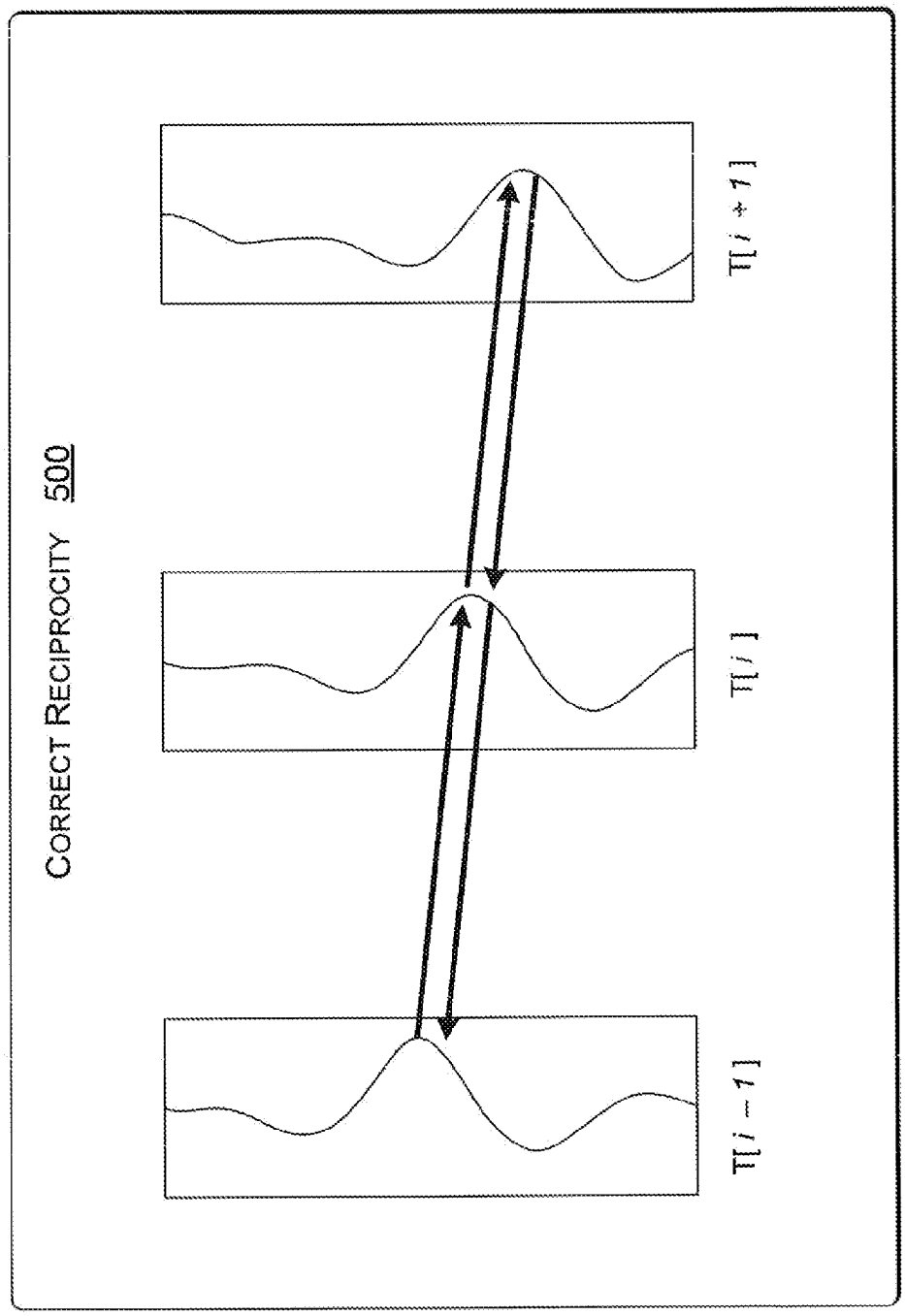
FIG. 5 is a diagram showing correct reciprocity between adjacent traces.

Reciprocity, as used herein, means that there should be symmetry in the estimates of dip, both in the inline and crossline directions. FIG. 5 illustrates correct reciprocity 500, in relation to the single dip constraint of reciprocity. T[i−1], T[i] and T[i+1] are three neighboring seismic traces. The top arrows illustrate estimated dip in the "right" direction (towards larger indexes), while the bottom arrows illustrate estimated dip in the "left" direction (towards smaller indexes). By following the arrows to the right, and then to the left again, a process should end up at the same vertical position as the starting location.

Figure 6:
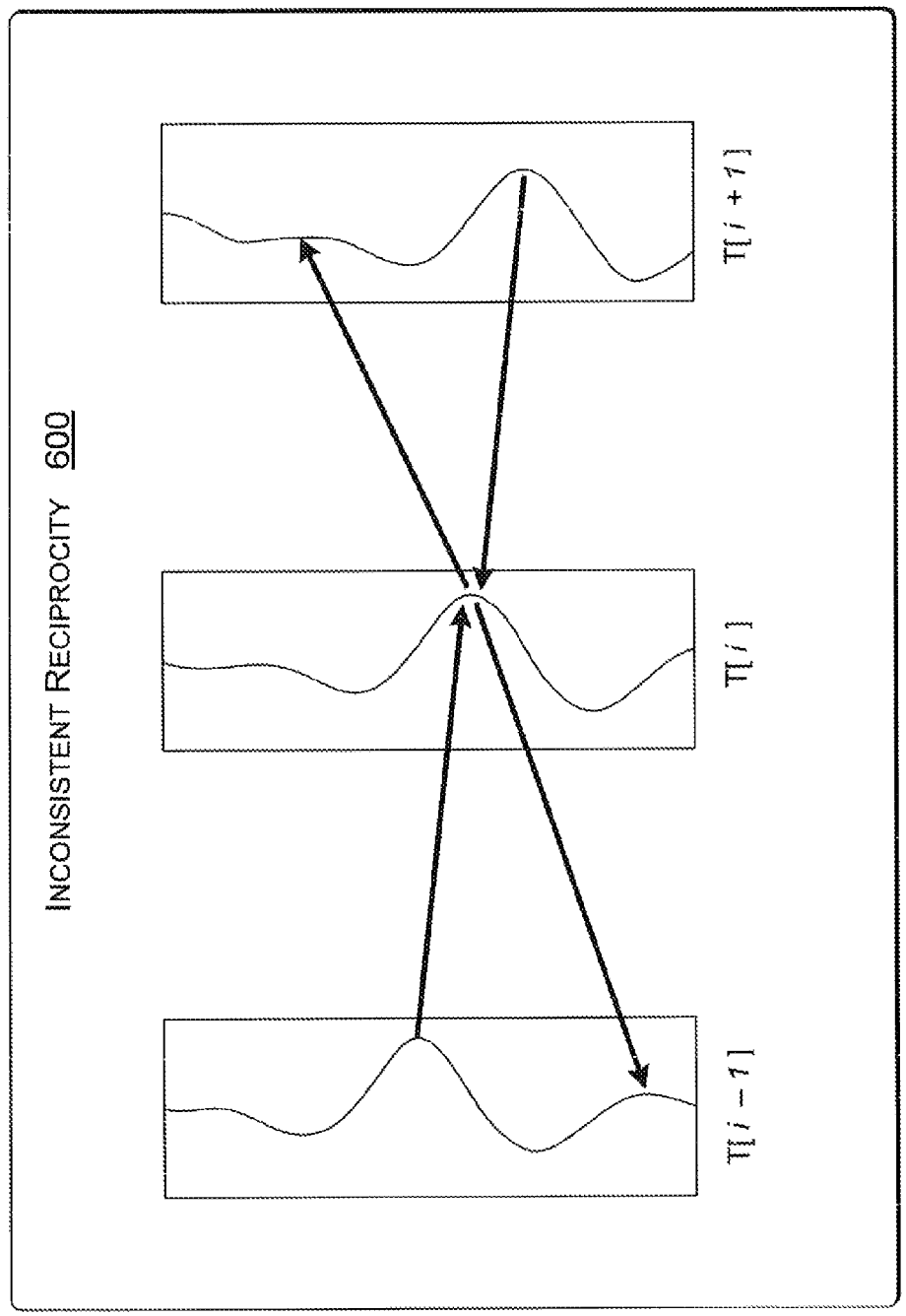
FIG. 6 is a diagram showing incorrect reciprocity between adjacent traces.

FIG. 6 illustrates incorrect reciprocity 600. Erroneous dip estimates violate the reciprocity constraint. A dip in the "left" direction is not the reverse of a dip in the "right" direction, but rather a dip right and a corresponding dip left bring a process back to a different starting point. Using merely conventional local dip estimation methods, where dip is estimated for each trace/sample independently, there is no guarantee that the reciprocity constraint is satisfied, even with a large 3D averaging window.

Figure 7:
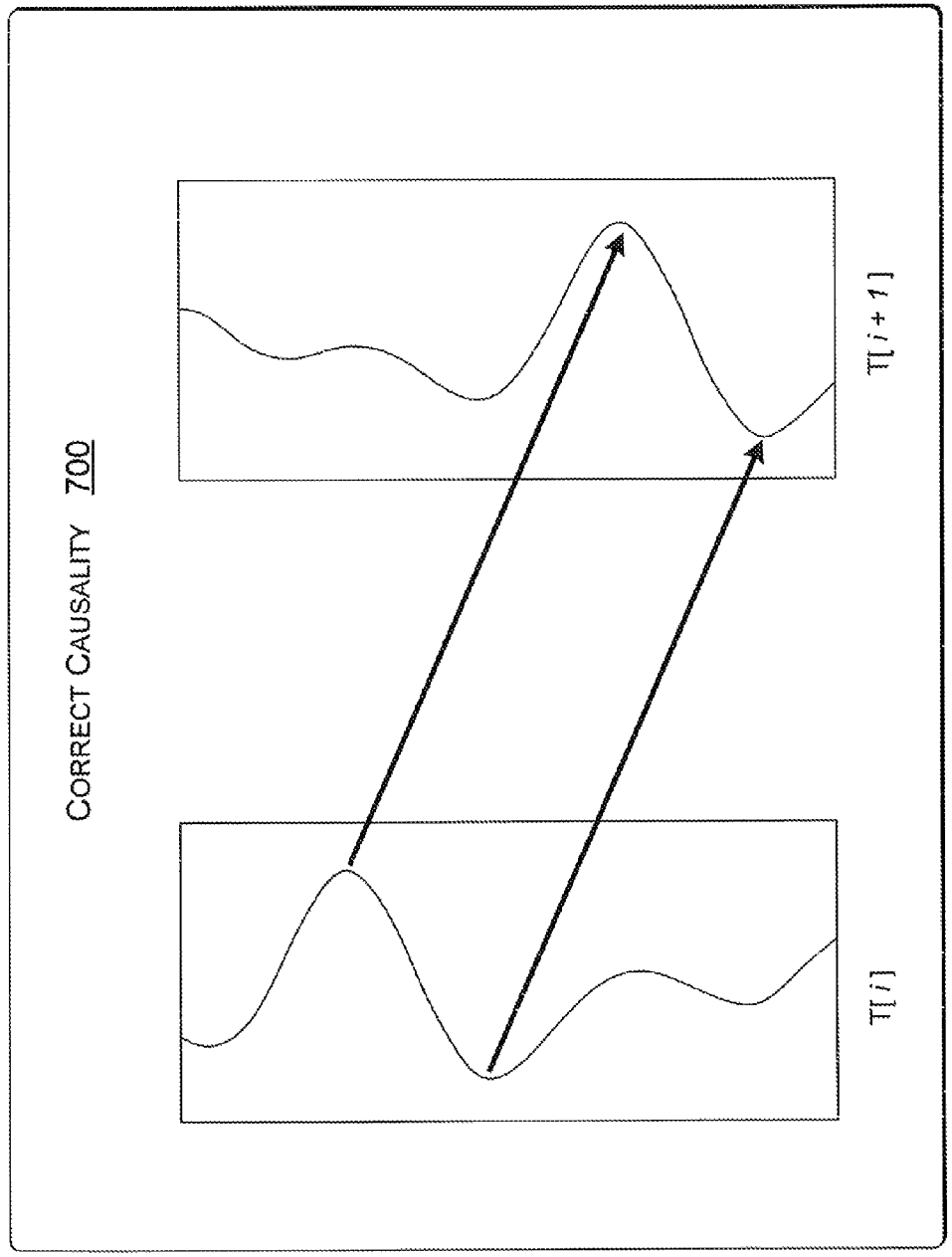
FIG. 7 is a diagram showing correct causality between adjacent traces.

Causality, as used herein, means that there should be no crossing dip estimates, either in the inline direction or the crossline direction. FIG. 7 illustrates correct causality 700, in relation to the single dip constraint of consistent causality. In the figure, the arrows, which indicate estimated dip for each sample time, do not cross each other at any point. This characteristic of dip is inherent in nature, but ignored by conventional dip estimation techniques.

Figure 8:
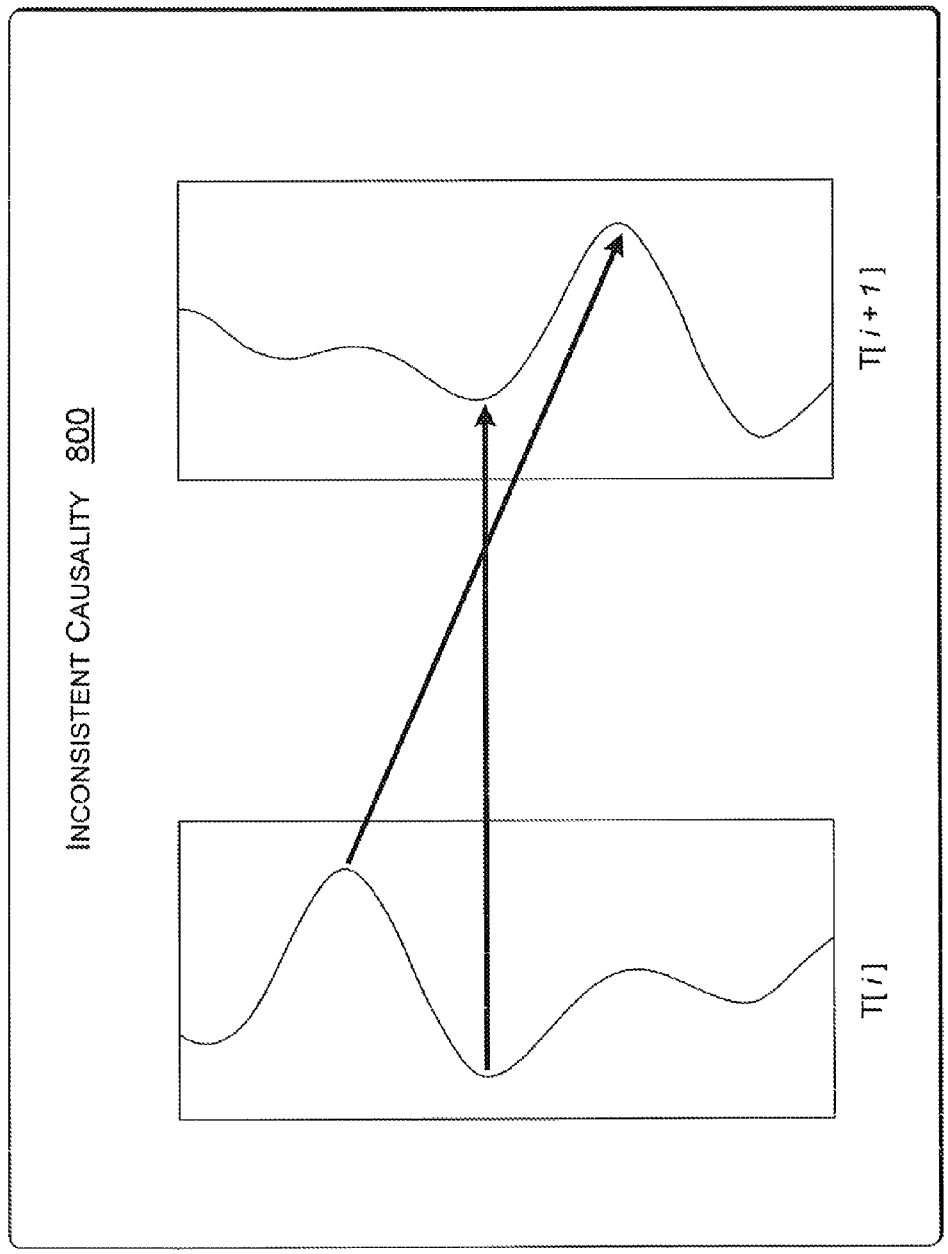
FIG. 8 is a diagram showing incorrect causality between adjacent traces.

FIG. 8 illustrates inconsistent causality 800. When there are erroneous dip estimates, the estimate is not casual, in the sense that such dips cannot happen in nature. Hypothetically, if such inconsistent causality could happen in nature, it might be interpreted as the base interface of one layer of rock suddenly flipping to become the top interface of the same layer. Yet, when the dip of each sample is estimated independently as in conventional methods, there is no guarantee that non-casual estimates will be avoided.

This consistent causality constraint, incidentally, is similar to the concept employed in many event registration techniques, including a method known as Non-Rigid Matching, e.g., for usage in the seismic domain, for time-lapse purposes (Schlumberger).

Figure 9:
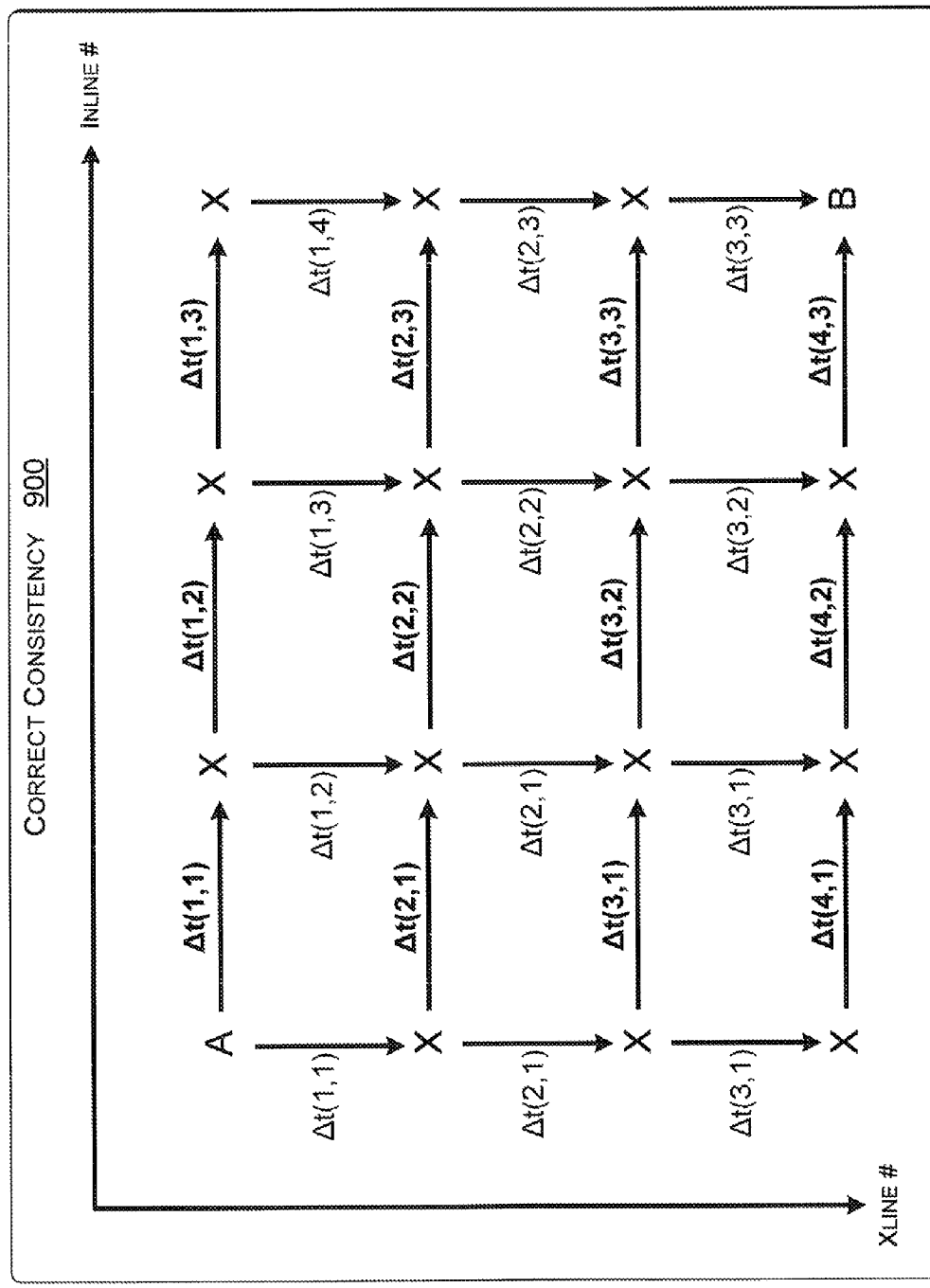
FIG. 9 is a diagram of correct consistency from a point A on a first trace to a point B on a second trace.

FIG. 9 illustrates consistency 900, as a joint dip constraint. When correct dips have been estimated in both dimensions (inline and crossline) for every location the volume at hand, then traversing between an arbitrary starting point in the volume and an arbitrary ending point in the volume is reliably path independent. That is, any logically feasible path that can be imagined from the starting point to the ending point, using the consistent dip estimates along the way as way marks, should lead from the starting point to precisely the ending point.

This joint dip constraint of consistency can be implemented easily by the consistency verifier 236 of the volume dip estimation engine 120, because if there is consistency between any two neighboring traces in a volume, then by implication, there is also consistency between any two non-neighboring positions in the same volume.

The joint dip constraint of vertical and lateral continuity is based on the knowledge that seismic has limited resolution laterally and vertically. This implies that there are limits to how fast estimated dips can change in the inline, crossline and vertical directions. There are limits to how large the spatial and temporal derivatives of the dips can be. This continuity constraint can be implemented in many ways, but in a preferred approach, the continuity verifier 238 applies a mean filter, with a user-specified vertical and lateral radius, to the estimated inline and crossline dip, near the end of each iteration step.

Mapping Discontinuities

Figure 10:
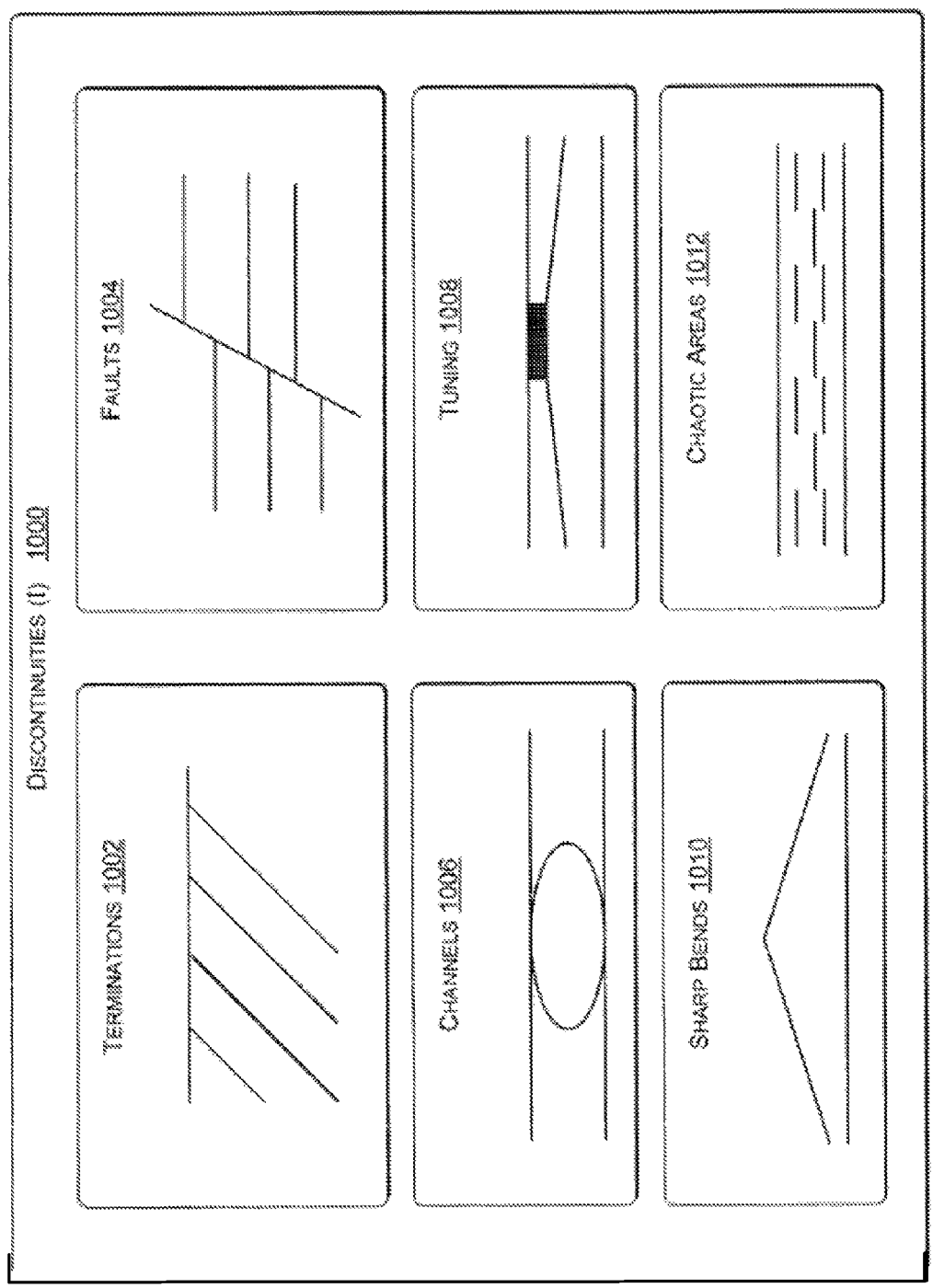
FIG. 10 is a diagram of example geologic discontinuities.

Although the iterative global optimization of dip estimates being described assumes lateral and temporal continuity, the process will fail to converge under some circumstances. As shown in FIG. 10, discontinuities 1000, such as terminations 1002, faults 1004, channels 1006, tuning 1008, sharp bends 1010, chaotic areas 1012, and so forth, may cause the iterative dip estimation to diverge at specific locations in the volume, instead of converge to a stable solution.

Figure 11:
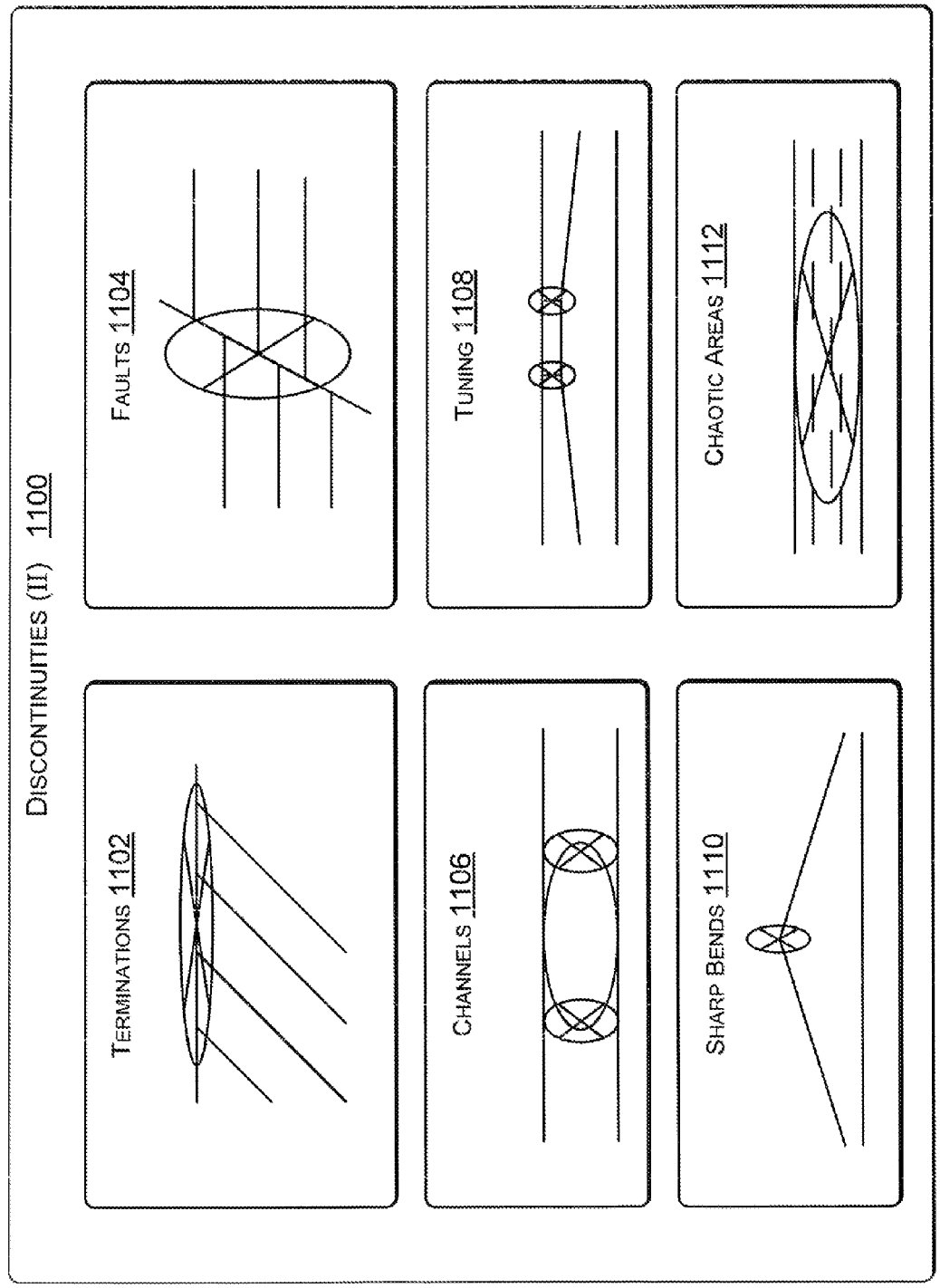
FIG. 11 is a diagram of example geologic discontinuities, marked where iterative optimization fails.

In these cases, the quality attribute engine 210 outputs a quality attribute, which can highlight areas where the optimization fails, as shown in FIG. 11, where a circled "X" represents a discontinuity where a quality attribute is generated. That is, the circled crosses in FIG. 11 are where the dip estimation process would be expected to diverge, and where the quality attribute engine 210 outputs quality attribute (or convergence attribute) to highlight anomalous values.

Example Code Implementation

Certain implementations of the iterative dip estimation process being described or components of the volume dip estimation engine 120 can be implemented at least in part in computer-executable code, such as the following example pseudo-code, which uses a C-language-like syntax to explain the various iterative steps:

```
//------------------------------------------
// BEGINNING of dip estimation process
//------------------------------------------
// Parameters:
SeismicCube S ; // In : seismic cube
Int num_iterations ; // In : desired max number of iterations
SeismicCube DI = 0 ; // Out: Estimated inline dip (in unit ms/trace or meter/trace)
SeismicCube DX = 0 ; // Out: Estimated xline dip (in unit ms/trace or meter/trace)
SeismicCube Err = 0 ; // Out: QC Attribute indicating local divergence
// Start of process:
SeismicCube S_COND = Condition(S) ; // Optional step, but often useful, depending on
implementation
SeismicCube DI_res = 0 ; // Residual inline dip, estimated in current iteration
SeismicCube DX_res = 0 ; // Residual xline dip, estimated in current iteration
SeismicCube DI_old = 0 ; // Estimated inline dip in previous iteration
SeismicCube DX_old = 0 ; // Estimated xline dip in previous iteration
Bool isDone = false ; // Flag indicating if we should stop iterating
Int iterNo = 0 ; // Iterator count
while (not isDone ) // Iteratively refine dip estimates
{
iterNo = iterNo + 1 ;
DI_old = DI ;
DX_old = DX ;
DI_res = EstimateResidualDips ( S_COND, DI, "inline" ) ;
DX_res = EstimateResidualDips ( S_COND, DX, "crossline" ) ;
DI = DI + DI_res ;
DX = DX + DX_res ;
DI = WeightedMeanFilter3D( S, DI ) ; // Optional, but often useful, step
DX = WeightedMeanFilter3D( S, DX ) ; // Optional, but often useful, step
DI = ApplySingleDipConstraints( DI ) ;
DX = ApplySingleDipConstraints( DX ) ;
(DI,DX) = ApplyJointDipConstraints ( DI, DX ) ;
DI = WeightedMeanFilter3D( S, DI ) ;
DX = WeightedMeanFilter3D( S, DX ) ;
// Determine if we are finished iterating ...
if ( iterNo >= num_iterations ) // Reached maximum number of iterations
{
isDone = true ;
}
else if ( isStableSolution(DI,DX,DI_old,DX_old) )
{
isDone = true ;
}
}
Err = EstimateLocalDivergence(S_COND,DI,DX,DI_old,DX_old) ;
//------------------------------------------
// END of dip estimation process
//------------------------------------------
```

In one implementation, the volume dip estimation engine 120 produces a stable volume dip estimation in approximately 10-50 iterations. But, the number of iterations needed to converge to a stable result depends largely on both the quality of the input seismic data 200, and on the size of selected lateral/vertical smoothing operators.

In one implementation, the volume dip estimation engine 120 calculates inline dips (i.e., dips along the sail/shooting/cable direction) and crossline dips (across sail/shoot/cable lines), instead of other potential representations of the dip field (such as, a dip/azimuth representation). Two reasons for this inline/crossline choice are easier quality control, and separation of data acquisition noise. With respect to easier quality control, seismic is often visualized using inline or crossline seismic sections. Hence, it is useful to present users with dip estimates that correlate with visible dips in a 2D display.

With respect to separation of acquisition noise, some noise patterns are often correlated to the seismic acquisition geometry (and hence referred to as acquisition footprints). In that case, acquisition noise is most predominant in the crossline direction, and hardly any noise is present in the inline dip (the dip along one inline). Thus, the inline dip estimate often contains no acquisition footprints, while there is plenty of artifactual noise in the crossline estimate. By representing the dip estimates as inline/crossline dips, the volume dip estimation engine 120 can manage separation of the acquisition noise into only one component of the estimate. On the other hand, if dip magnitude and dip azimuth are used as the preferred representation for the dip vector (i.e., basis functions), both components are contaminated with the acquisition noise.

Operation of the Example Volume Dip Estimation Engine

The components and functions of the example volume dip estimation engine 120 of FIG. 3, can be combined and labeled in different ways. The arrangement shown in FIG. 3 is meant to call out specific components, functions, and roles for the sake of description. But the illustrated example in FIG. 3 is not intended to be limiting. The volume dip estimation engine 120 can be broken out into different components than shown, or different combinations and arrangements of the components, with different names.

Figure 12:
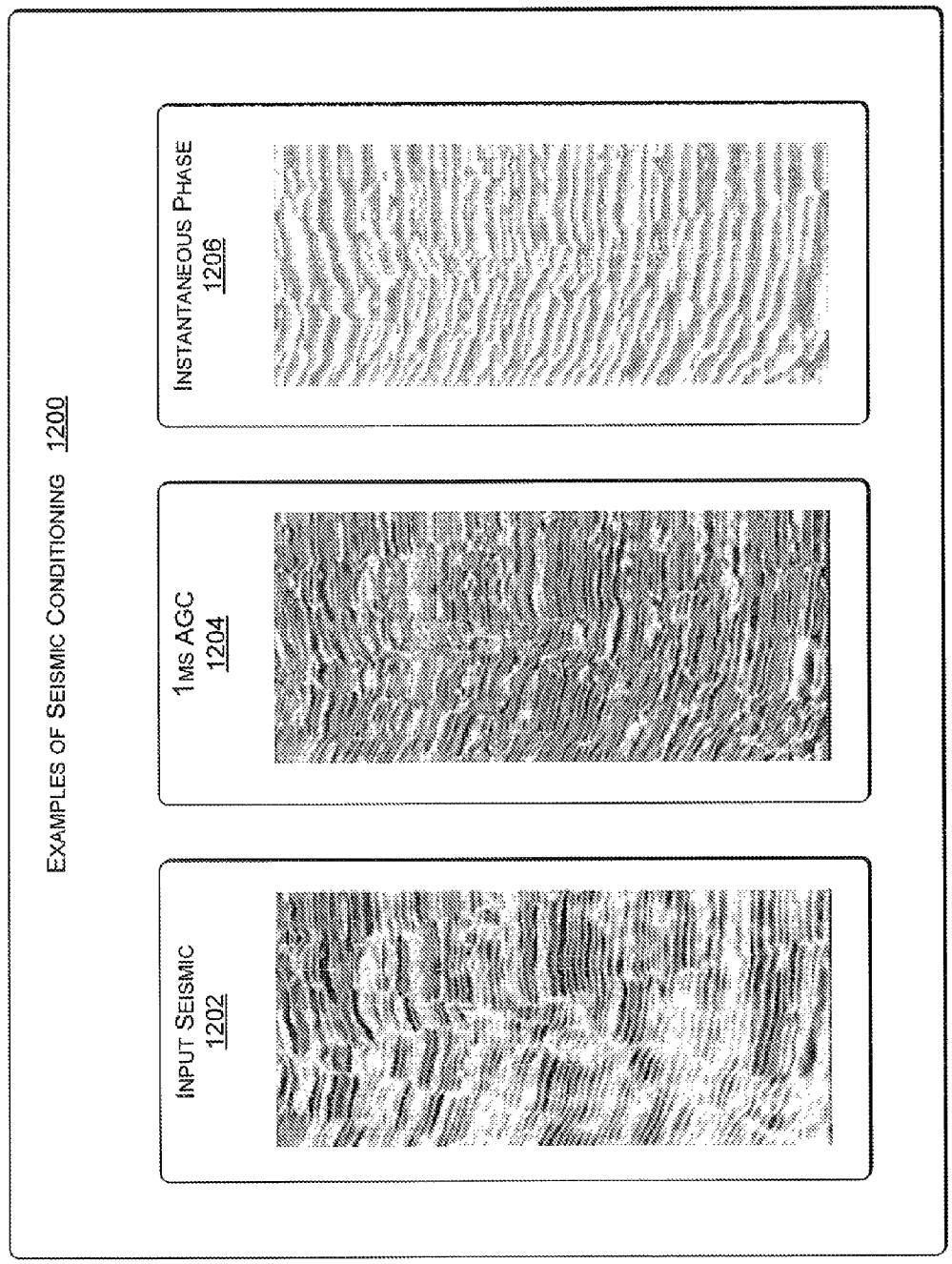
FIG. 12 is a diagram of seismic input and seismic conditioning examples.

In one implementation of the volume dip estimation engine 120, seismic conditioning by the preconditioner 202 may, or may not, be needed, depending on the implementation of the time-shift estimation technique used in the time-variant stretch corrector 224. In general, it is better when the dip estimation process is independent of (or insensitive to) amplitude variations along interfaces. So, it can be useful to perform dip estimation on derived attribute volumes, where the attribute used masks irrelevant amplitude variations—instead of performing dip estimation on the seismic amplitude volume itself. Some useful 3D attribute volumes that can be utilized include 1D AGC (windowed Automatic Gain Control), 3D AGC, and Instantaneous Phase. FIG. 12 shows some examples of conditioning. From the input seismic 1202, FIG. 12 shows 1 millisecond AGC 1204, and Instantaneous Phase 1206. In a preferred implementation, the preconditioner 202 applies a 3D AGC conditioning of the input volume 1202, because this conditioning is fairly signal-consistent (e.g., no snapping to a closest sample). The 3D conditioning respects the extrema positions of the reflectors, while discriminating somewhat between weak (more likely to be noise) and strong interfaces (more likely to be real reflections).

The preconditioner 202 may apply other useful steps, such as lateral filtering and/or vertical filtering. Dip fields with lower lateral resolution than the input seismic are often desirable. It can also be desirable to attenuate the highest frequencies in the seismic data, as these frequencies may be the most contaminated by noise, and instead focus the dip estimation process on that part of the frequency spectrum with the best signal-to-noise ratio.

In one implementation, the residual dip estimator 281 obtains a remaining time-variant dip-correction needed to minimize the difference between neighboring traces on each side of a current trace at hand, for each dimension (i.e., the inline and crossline directions). That is, for each trace in the volume, the residual dip estimator 218 extracts the preceding and following trace in that direction, to be stored in the adjacent trace buffer 222, and the correlation maximizer 220 applies a time-variant stretch for each of the neighboring traces, using the current estimate of optimal dip as argument. Then the time-variant stretch corrector 224 estimates the residual/remaining time-variant dip-correction needed to maximize similarity with (or equivalently to minimize the difference from) the central or current reference trace. Preferably, the time-variant dip at the trace labeled "i" will be the average of the time-variant dip calculated from the preceding trace ($\Delta T-$) and the trailing ($\Delta T+$) trace, as shown in Equation (1):

$$\Delta T = 0.5(-\Delta T- + \Delta T+) \quad (1)$$

This treatment of dip follows the polarity convention that a positive dip moves down to the right (or up to the left).

Figure 13:
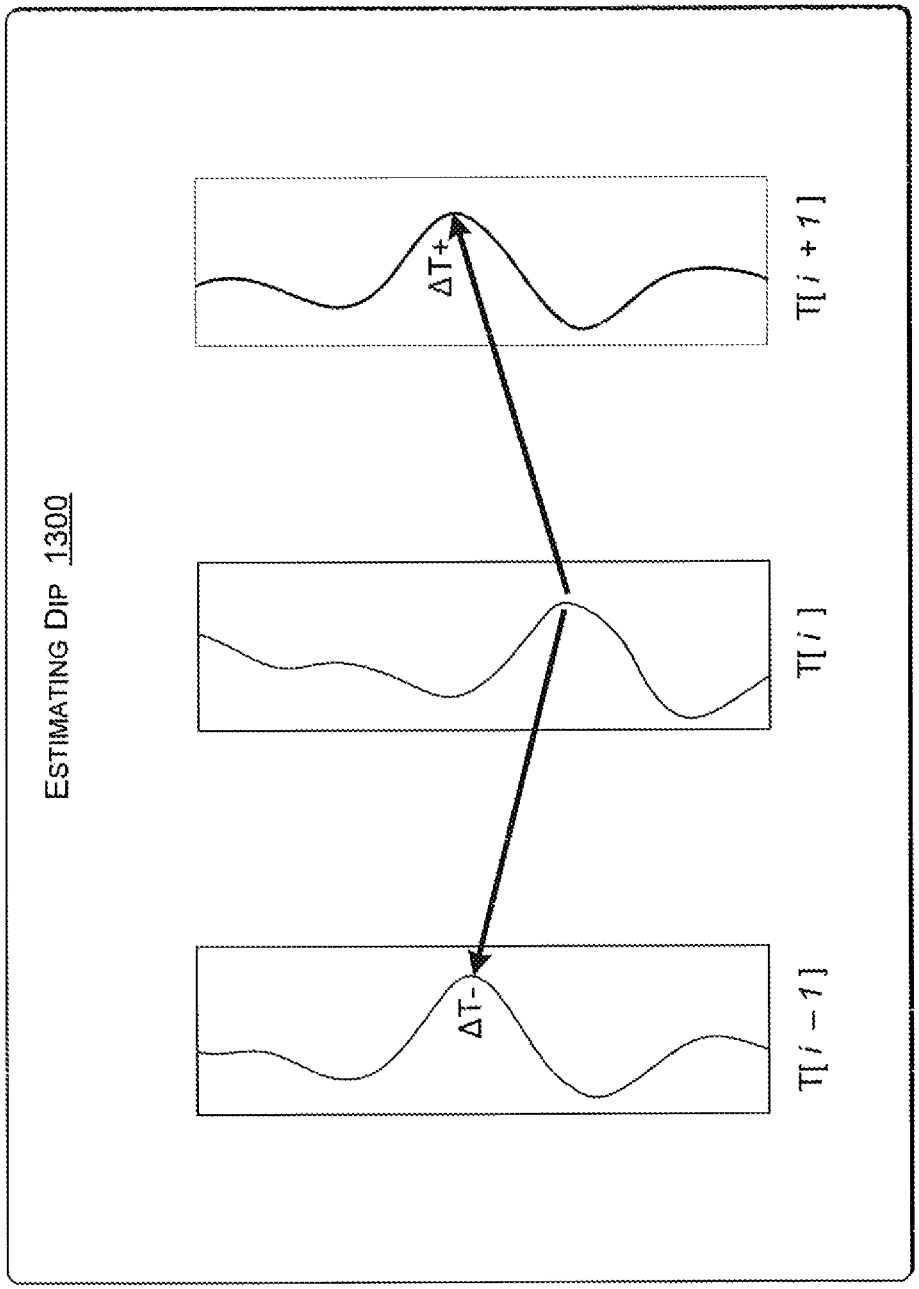
FIG. 13 is a diagram of estimating dip between neighboring traces.

FIG. 13 shows an example of estimating dip between neighboring traces. It should be noted that the time-variant stretch corrector 224 re-samples all neighboring traces. These are stored in an area of memory 110, such as the adjacent trace buffer 222. This part of the dip estimation process can be a delicate process, requiring a good-quality interpolator 228. A preferred interpolator 228 is a "sine" interpolator, with a radius of at least 3 points (more points are better, but makes the process correspondingly more expensive to compute).

The apparent dip estimator 214 can perform the actual dip-estimation in several ways. One popular way is for the apparent dip estimator 214 to apply windowed cross-correlation (or perhaps normalized cross-correlation), scanning for the dip that yields the maximum gross correlation (i.e., similarity) between the reference trace, and the neighboring trace, in a tapered window around each sample in the reference trace. In one implementation, the user specifies the maximum dip, in order to restrict the scanning window. It is a minor challenge to detect the peak of the correlation function, with sub-sample precision. However, solutions to this problem are described in many places in the relevant literature of the industry, and so are not repeated here.

The apparent dip estimator 214 may also apply a process known as "phase matching," which operates in the frequency domain. This process seeks the frequency-dependent phase shift that optimally aligns each frequency, from trace to trace, and then converts this estimated phase-shift (in the frequency domain) to the equivalent time-shift in the time domain. Mathematically, this can be seen as a cross-correlation, performed in the frequency domain. This approach may yield better results than ordinary cross-correlation, because the process is insensitive to spatial amplitude variations (the amplitude spectrum is ignored), and also because the process is usually faster to execute (has a shorter run-time).

In a preferred implementation, the apparent dip estimator 214 applies a Taylor Series approximator 216 to apply a Taylor expansion or approximation around the samples of interest. The Taylor Series approximator 216 can provide finer vertical resolution than other techniques, i.e., as cross-correlation needs a vertical operator length that is much longer than the Taylor expansion approach. In one implementation, because the operator employed is shorter, the computing cost is also much lower than for cross-correlation and phase-matching.

FIG. 14 shows an example outline of a Taylor Series expansion as applied to dip estimation. A preferred approach includes a small whitening term "ϵ", in order to avoid division-by-zero situations when the derivative of a neighboring trace is zero for a given sample (which would indicate a peak or a trough at that sample, i.e., a locally constant signal, where dips are thus undefined). The whitening term should be a very small value, compared to the average root-mean-square (RMS) value of the conditioned seismic, in order to not bias the estimate in areas with average signal strength.

The Taylor Series Approximator 216 may yield incorrect results when there are very steep dips, due to the phenomenon of "cycle skipping" (i.e., aligning wrong events), but the scenario of very steep dips is not very common in nature. When the dips are very steep, or if the input data 200 is very noisy, then the cross-correlation approach may be preferable as an alignment method, as cross-correlation uses more samples (i.e., a larger operator) in the matching, improving the likelihood of deriving a robust dip estimate. Longer operators, however, imply a decrease in the vertical resolution of the dip estimate.

In order to ensure lateral and vertical continuity of estimated dips (or the estimated residual dips), a weighted mean filter 230, such as a 3D filter, may be applied to the input data volume to be smoothed. It is not crucial that the filter be weighted. The filter can be an ordinary 3D mean filter, or any other 3D hi-cut filter, such as a median filter. It has proven, however, to be beneficial to add extra weight to initial estimates derived from strong reflectors in the seismic input 200. So, if cross-correlation is the matching method, then the absolute values of the seismic data can be used as weights. In the case of the Taylor Series expansion approach, the most robust dip estimates are found wherever there are strong temporal derivatives (and then the whitening factor has little influence). In this case, the absolute value of the time-derivative of the seismic can be used as the weight. It is also an option to use the conditioned seismic, or for example, the derivative of such, as weights.

Implementations of a 3D weighted mean filter 230 and its use are well known in the industry. For example, this common filter may be used:

Mathematical Definition:

Formally, the weighted mean of a non-empty set of data $$[x_1, x_2, \ldots, x_n],$$

with non-negative weights $$[w_1, w_2, \ldots, w_n],$$

is the quantity in Equation (2):

$$\bar{x} = \frac{\sum_{i=1}^{n} w_i x_i}{\sum_{i=1}^{n} w_i}, \qquad (2)$$

which means, as in Equation (3):

$$\bar{x} = \frac{w_1 x_1 + w_2 x_2 + \ldots + w_n x_n}{w_1 + w_2 + \ldots + w_n}. \qquad (3)$$

Data elements with a high weight contribute more to the weighted mean than do elements with a low weight. The weights cannot be negative. Some may be zero, but not all of them (since division by zero is not allowed).

The formulas are simplified when the weights are normalized such that they sum up to 1, as in Equation (4):

$$\sum_{i=1}^{n} w_i = 1. \qquad (4)$$

For such normalized weights the weighted mean is simply, as in Equation (5):

$$\bar{x} = \sum_{i=1}^{n} w_i x_i \qquad (5)$$

The common mean is a special case of the weighted mean where all data have equal weights, $w_i = w$, as below:

$$\frac{1}{n} \sum_{i=1}^{n} x_i$$

In this mathematical definition, only one index is averaged over. In practice, in a preferred implementation, the filter 230 calculates the average in a volume defined by an operator radius in the inline, crossline and vertical directions, possibly with a varying radius in each direction, depending on the desired variability for each dimension.

Applying Single Dip Constraints

The single (or singular) dip constraint engine 206 detects situations where a dip field has impossible estimates of realistic dip. The reciprocity verifier 232 checks the input dip fields to verify that the fields at all locations have reciprocity (i.e., symmetry—see FIG. 5), while the causality verifier 234 check to make sure that all dip samples are casual (i.e., no conflicting/crossing dips—see FIG. 7). If the single dip constraint engine 206 finds dip estimates that violate either of these two constraints, the engine 206 may set these erroneous dip estimates to zero, since a next step in the process may be spatial and temporal filtering, and such filtering will propagate an estimate which is closer to the true value (than the erroneous sample) into the zeroed samples, thereby securing convergence toward a more stable estimate globally.

Other schemes can also be used. The single dip constraint engine 206 may flag all violating samples as void, and apply some variety of weighted spatial filtering that explicitly ignores the void (i.e., illegal) samples in the filtering, by setting the weight for the void samples to zero.

Applying Joint Dip Constraints

This joint dip constraint engine 208 checks the internal consistency of individually estimated dips in the inline and crossline directions. When the consistency verifier 236 finds, for any given sample, that two different paths from a starting location towards the same arbitrary neighboring trace yield ambiguous (different) vertical destination positions in the neighboring trace, then the dip estimates at that location and vertical position are deemed to be inconsistent. The joint dip constraint engine 208 may then apply one of several update schemes, which move the inconsistent dip estimates towards a more stable solution, ensuring eventual convergence of the overall iteration scheme. One approach is to set the illegal samples to zero, and rely on subsequent lateral filtering to move the local estimate toward a more stable value. Or, in a preferred implementation, the joint dip constraint engine 208 may calculate the average dip in the direction of the neighboring trace that has the erroneous dip estimate, and then set the dip along the different trajectories toward the neighbor to be the average of the estimated dips, so that on average, this solution moves the dip estimates toward a more correct global solution to the dip optimization problem.

Convergence of the Iterative Dip Optimization

The convergence estimator 212 establishes if the real time iterations of the volume dip estimation engine 120 are converging toward a stable solution, that is, that the estimates of inline and crossline dip are not substantially changing between iterations. In one implementation, the convergence estimator 212 estimates the maximum and mean change in each iteration, and compares these against pre-defined small threshold values. If the maximum or average change (or both) moves below the pre-defined threshold limits, then the convergence estimator 212 concludes that the process has converged to a stable solution, and that the volume dip estimation engine 120 can stop iterating toward a more accurate solution.

Estimating Local Divergence

In one implementation, near the end of the process, the quality attribute engine 210 includes a discontinuity flagger 240. This component records local areas in the input volume where a stable and consistent dip model has not been found during iterations of the volume dip estimation engine 120—because the usual dip estimation model would infringe one or more of the of the above-described constraints for valid dips. There are many ways to flag these local areas where the estimation process diverges locally (or at least fails to converge). In a simple approach, the discontinuity flagger 240 outputs the difference between the estimates for the final two iterations. For example:

```
SeismicCube di = DI_old – DI ;
SeismicCube dx = DX_old – DX ;
Err = Sqrt ( di * di + dx * dx ) ;
DX_old = DX ;
```

Here the error is the RMS difference between the inline and crossline dip estimates, between the two last iterations. In a preferred implementation, the discontinuity flagger 240 signals the residual dip estimator 218 to perform one final residual dip estimate, and then uses this residual dip in each direction, preferably with a final spatial/vertical filtering, as the final indicator of areas where consistent dip estimates, according to the usual global constraints described above, are difficult to find:

```
SeismicCube di = EstimateResidualDips ( S_COND, DI, "inline" ) ;
SeismicCube dx = EstimateResidualDips ( S_COND, DX, "crossline" ) ;
di = WeightedMeanFilter3D( S, di ) ;
dx = WeightedMeanFilter3D( S, dx ) ;
Err = Sqrt ( di * di + dx * dx ) ;
```

The quality attribute engine 210 and/or the discontinuity flagger 240 do not void out samples which infringe the global constraints, in contrast to the action of the constraint engines 206 & 208 during the main iterations of the volume dip estimation engine 120. At this point in the process, the quality attribute engine 210 highlights, marks, flags, etc., these inconsistent samples: inconsistent in the sense that the dip model diverges because geologic discontinuities are being represented. In one implementation, the quality attribute engine 210 outputs an indicator in the form of a residual dip estimation, but in only one of the dimensions, for example along the inline direction, in order to ignore discontinuities representing data contaminated by noise and acquisition footprints, in the crossline direction.

Example Results

FIGS. 15-20 show example results from an implementation of the volume dip estimation engine 120 and exemplary dip estimation methods described herein.

Dip estimates have been calculated with three different parameter settings for a lateral and vertical filtering step, but keeping every other setting constant. Filter parameters used are:

Lateral Filter Radius=1 trace; Vertical Filter Radius=1 sample

Lateral Filter Radius=1 trace; Vertical Filter Radius=2 samples

Lateral Filter Radius=2 traces; Vertical Filter Radius=4 samples

Figure 15:
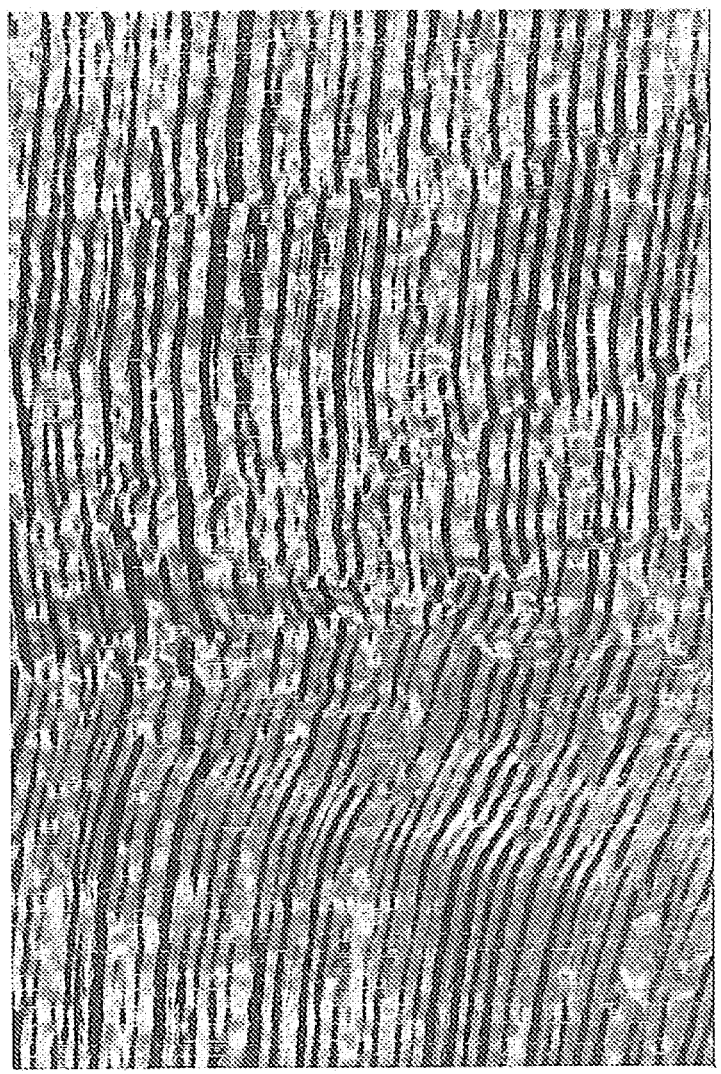
FIG. 15 is a diagram showing an example estimated inline dip using radii 1, 1.

FIG. 15 shows an example estimated inline dip using radii 1, 1.

Figure 16:
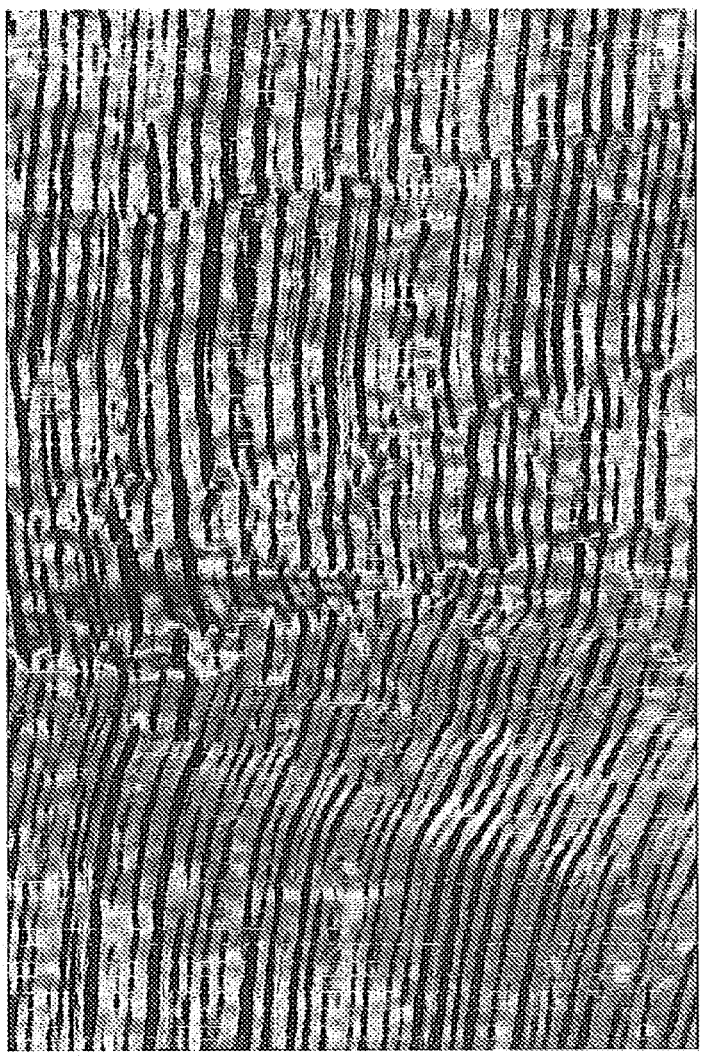
FIG. 16 is a diagram showing an example estimated inline dip using radii 1, 2.

FIG. 16 shows an example estimated inline dip using radii 1, 2.

Figure 17:
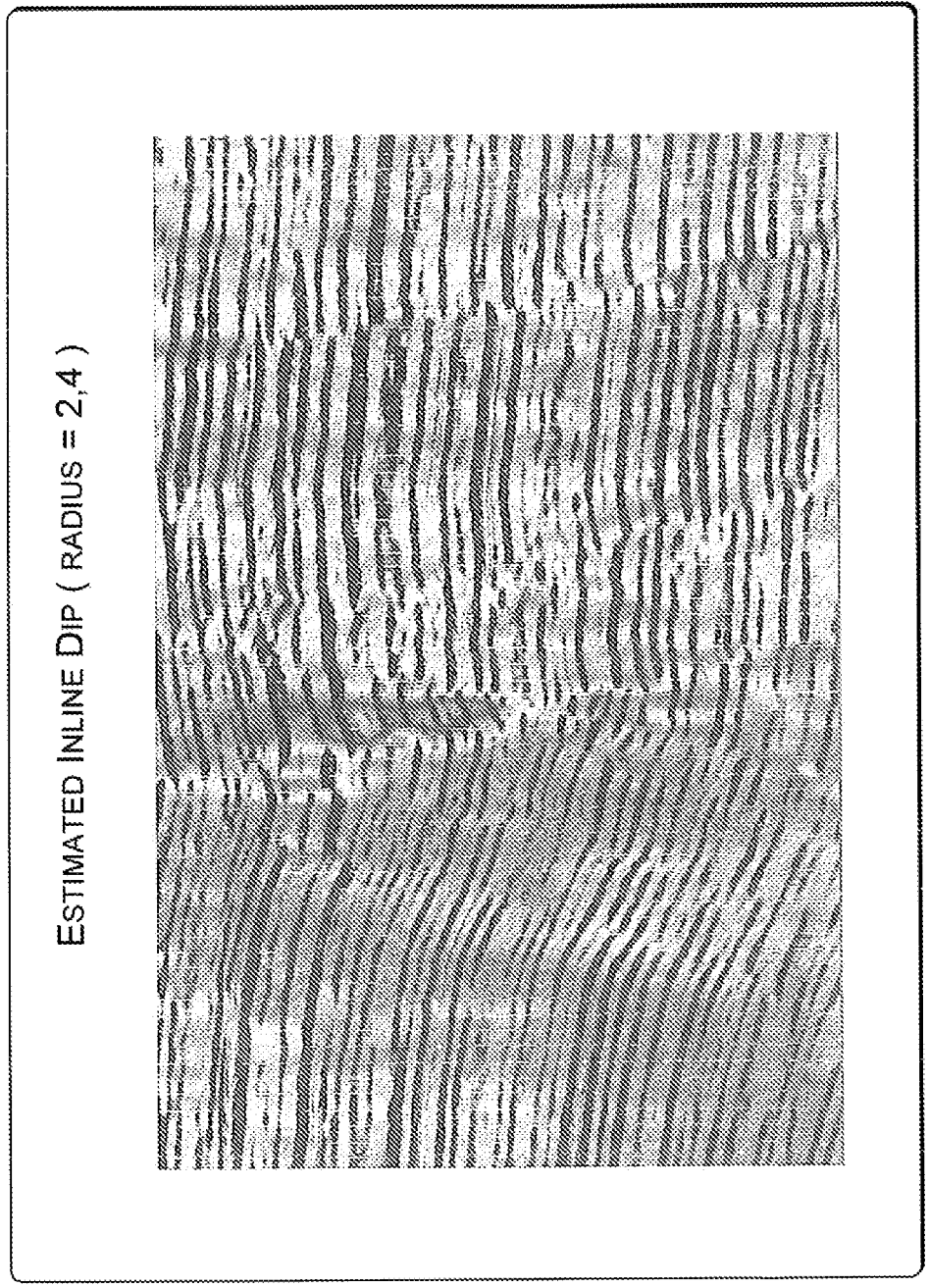
FIG. 17 is a diagram showing an example estimated inline dip using radii 2, 4.

FIG. 17 shows an example estimated inline dip using radii 2, 4.

Figure 18:
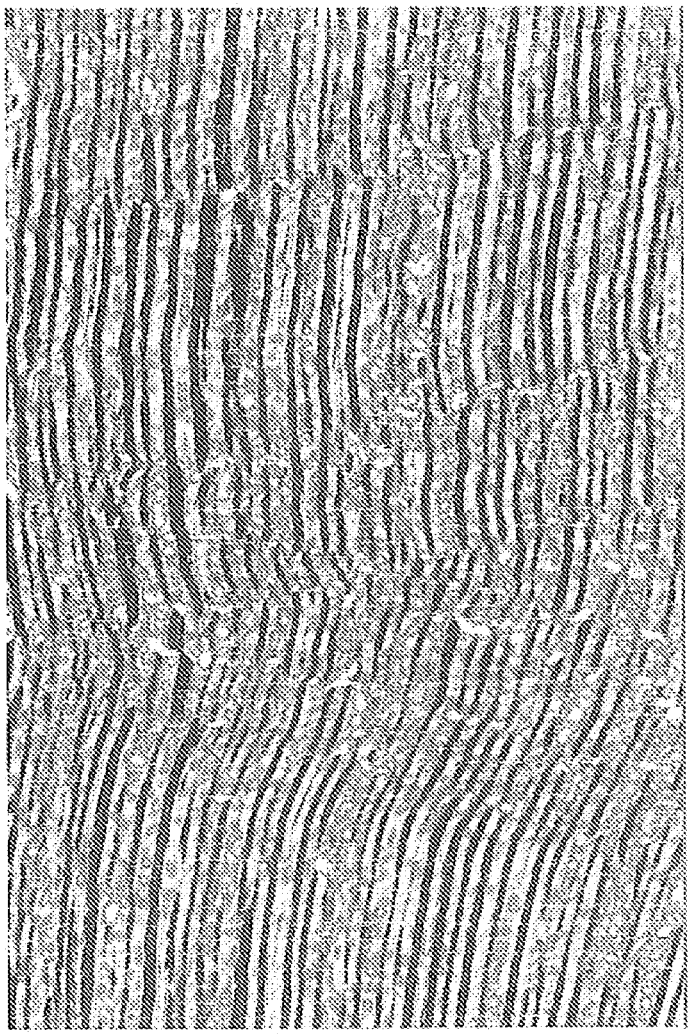
FIG. 18 is a diagram showing estimated error of FIG. 15, at radii 1, 1.

FIG. 18 shows the example estimated error at radii 1, 1.

Figure 19:
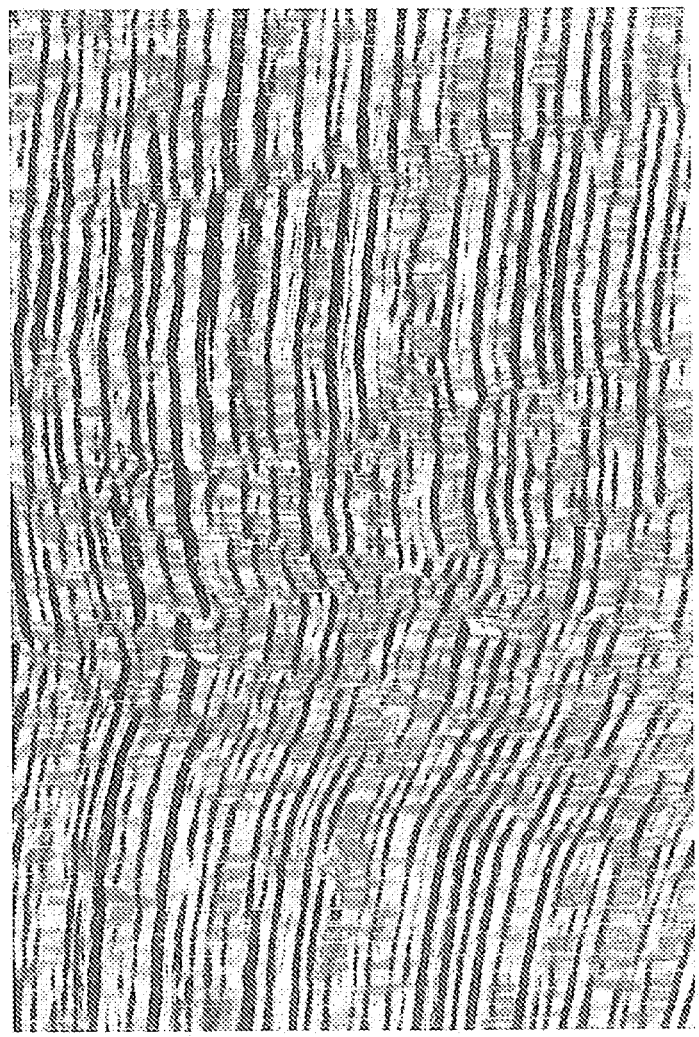
FIG. 19 is a diagram showing estimated error of FIG. 16, at radii 1, 2.

FIG. 19 shows the example estimated error at radii 1, 2.

Figure 20:
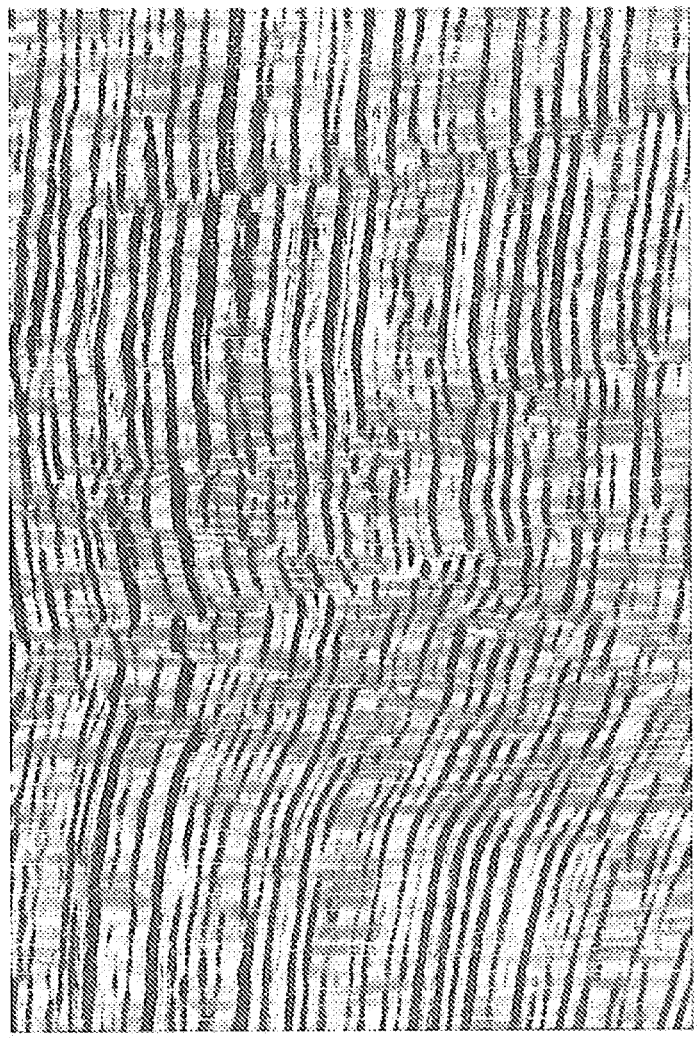
FIG. 20 is a diagram showing estimated error of FIG. 17, at radii 2, 4.

FIG. 20 shows the example estimated error at radii 2, 4.

Example Method

Figure 21:
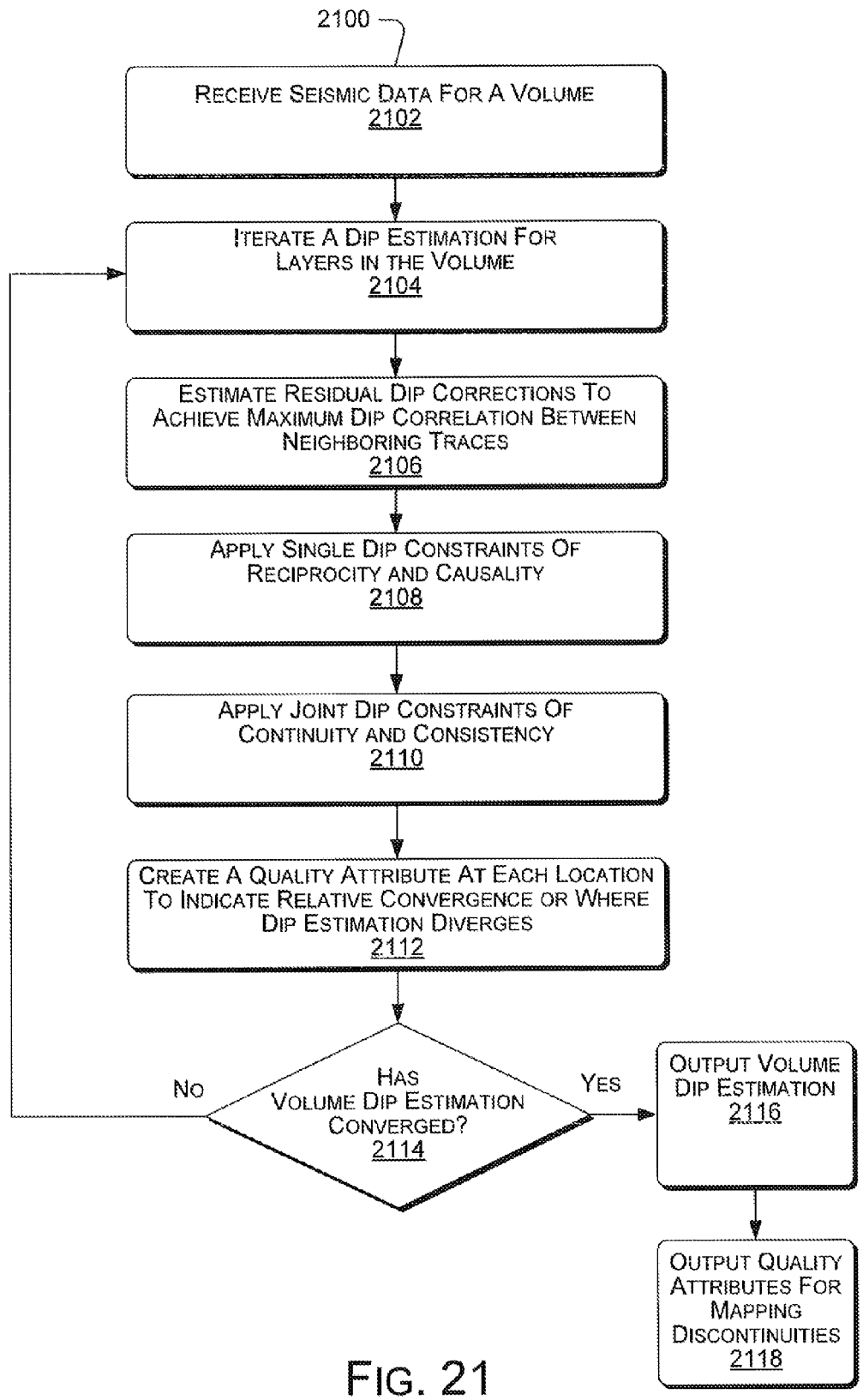
FIG. 21 is a flow diagram of an example method of consistent volume dip estimation.

FIG. 21 shows an example method of volume dip estimation 2100. In the flow diagram, the operations are summarized in individual blocks. The example method 2100 may be performed by hardware or combinations of hardware and software, for example, by the volume dip estimation engine 120.

At block 2102, seismic data associated with a volume is received.

At block 2104, a dip estimation for layers in the volume is determined by iteration.

At block 2106, residual dip corrections to achieve maximum dip correlation between neighboring traces are estimated.

At block 2108, single dip constraints of reciprocity and causality are applied.

At block 2110, joint dip constraints of continuity and consistency are applied.

At block 2112, a quality attribute is created for at least each location where dip estimation diverges from iterative optimization.

At block 2114, a determination considers whether the volume dip estimation has converged to a stable solution. If the dip estimation has not converged, the method loops back to begin another iteration at block 2104. If the dip estimation has converged to a stable solution, then the method continues at block 2116.

At block 2116, the process outputs the optimized volume dip estimation.

At block 2118, the process also outputs quality attributes for mapping discontinuities in the volume.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. A non-transitory computer-readable storage medium, containing instructions, which when executed by a computer perform a process, comprising:
   receiving seismic data from traces of a subsurface volume;
   iteratively refining a dip estimation of the subsurface volume, including:
      estimating a residual dip correction to optimally align adjacent traces with maximum correlation for each inline and crossline dimension in the subsurface volume;
      applying single dip constraints to the dip estimation;
      applying joint dip constraints to the dip estimation;
      creating a quality attribute when the iterative dip estimation diverges to indicate a local discontinuity in the subsurface volume; and
   creating a 3D representation of horizons in the volume based on the iterative dip estimation and the quality attributes.

2. The non-transitory computer-readable storage medium of claim 1, containing instructions, which when executed by a computer apply a Taylor Series expansion to dip estimation.

3. The non-transitory computer-readable storage medium of claim 1, wherein the applying singular dip constraints to the dip estimation comprises checking the dip estimation for reciprocity and causality.

4. The non-transitory computer-readable storage medium of claim 1, wherein the applying joint dip constraints to the dip estimation comprises checking the dip estimation for a consistency in predicting a vertical position on a neighboring trace by different paths.

5. The non-transitory computer-readable storage medium of claim 1, further comprising instructions, which when executed by a computer perform conditioning of the seismic data by applying a 3D automatic gain control to obtain a derived attribute volume for dip estimation.

6. The non-transitory computer-readable storage medium of claim 1, further comprising instructions, which when executed by a computer perform weighted mean filtering to provide a lateral and a vertical continuity of a plurality of dip estimates.

7. The non-transitory computer-readable storage medium of claim 1, further comprising instructions, which when executed by a computer perform flaging of local discontinuities in the 3D representation where a plurality of dip estimates diverge.

8. A method, comprising:
   receiving seismic data defining a volume, the seismic data for imaging layers of the volume;
   iteratively refining estimated dips for achieving a volume dip estimation of the volume while applying global consistency constraints, including:
      estimating a residual dip correction by interpolating to achieve a time-variant stretch correction that optimally aligns adjacent traces with maximum correlation by minimizing a vertical difference between neighboring traces on each side of a current reference trace for each inline and crossline dimension in the volume;
      applying singular dip constraints to the estimated dips;
      applying joint dip constraints to the estimated dips;
      generating a quality attribute to indicate a local convergence or a local divergence when said iteratively refining estimated dips encounters a discontinuity in the layers;
   after each iteration, comparing a change in the volume dip estimation to a threshold to detect a convergence of the volume dip estimation;
      when the change in the volume dip estimation is greater than the threshold, beginning a subsequent iteration; and
      when the change in the volume dip estimation is less than the threshold, then creating an image of the layers of the volume based on the volume dip estimation and based on the quality attributes that indicate local divergences.

9. The method of claim 8, wherein the volume dip estimation comprises one of:
   applying a windowed cross-correlation process to perform dip estimation;
   applying a normalized cross-correlation process to perform dip estimation;
   applying phase matching in the frequency domain to perform dip estimation; and
   applying a Taylor Series expansion or a Taylor Series approximation to perform dip estimation.

10. The method of claim 8, wherein applying the singular dip constraints comprises checking input dip fields to verify that the dip fields at all locations have a reciprocity or a symmetry and that the dip estimates are causal, yielding no conflicting or crossing dips;
   wherein when a dip field does not have reciprocity or symmetry or is not causal, then performing one of:
      setting the associated dip estimate to zero; and
      voiding the associated dip estimate and applying a weighted spatial filtering that ignores the voided dip estimate by setting a weight for the voided dip estimate to zero.

11. The method of claim 8, wherein applying the joint dip constraints comprises checking an internal consistency of each individual estimated dip in the inline and crossline dimensions, including:
   for each location in the volume, when two different paths toward a neighboring trace yield an ambiguous vertical position in the neighboring trace, then designating dip estimates at that location as inconsistent, and changing the inconsistent dip estimates, including one of:
      setting the inconsistent dip estimates to zero and applying lateral filtering to stabilize the dip estimates; and
      calculating an average dip in the direction of the neighboring trace and setting each dip estimate along the trajectories toward the neighboring trace to be the average dip.

12. The method of claim 8, further comprising pre-conditioning the seismic data to obtain a derived attribute volume for the volume dip estimation, including one of:
   applying 1D automatic gain control (AGC) conditioning to the input volume;
   applying a 3D automatic gain control (AGC) conditioning to the input volume;
   applying a windowed automatic gain control (AGC) conditioning to the input volume;
   applying an instantaneous phase conditioning to the input volume;
   applying a lateral filtering to the input volume; and
   applying a vertical filtering to the input volume.

13. The method of claim 8, further comprising applying a filter to an input volume to provide lateral and vertical continuity of the estimated residual dips, including one of:
applying a 3D mean filter;
applying a 3D hi-cut filter;
applying a median filter;
applying a weighted mean filter with weights assigned to initial estimates derived from strong reflectors in the seismic data, wherein the weights comprise the absolute values of the seismic data; and
applying a weighted mean filter, wherein the weights comprise absolute values of the time-derivatives of the seismic data.

14. The method of claim 8, further comprising flagging local areas in the volume where the volume dip estimation diverges.

15. A non-transitory computer-readable storage medium, containing instructions, which when executed by a computer perform a process, comprising:
receiving a seismic volume for a volume dip estimation;
modeling dip fields as continuous functions;
iteratively refining dip estimates for each inline trace and each crossline trace of the seismic volume, including iteratively applying global consistency constraints, including single dip constraints and joint dip constraints;
recording at each location a quality attribute indicating convergence or indicating where the dip estimates locally diverge at a discontinuity in the seismic volume;
testing for a convergence of the volume dip estimation at each iteration; and
upon convergence, outputting the volume dip estimation and an indication of the local divergences for mapping the discontinuities.

16. The non-transitory computer-readable storage medium of claim 15, further containing instructions for obtaining an automatic horizon interpretation from the volume dip estimation.

17. The non-transitory computer-readable storage medium of claim 15, further containing instructions for obtaining an automatic fault interpretation from the volume dip estimation.

18. The non-transitory computer-readable storage medium of claim 15, further containing instructions for applying a Taylor Series approximation to estimate a dip or to refine a dip estimate.

19. The non-transitory computer-readable storage medium of claim 15, wherein the single dip constraints test dip estimates for reciprocity and causality.

20. The non-transitory computer-readable storage medium of claim 15, wherein the joint dip constraints test the dip estimates for continuity and internal consistency with respect to path functions between adjacent traces within the seismic volume.

* * * * *